US007630454B2

(12) United States Patent
Kawasaki

(10) Patent No.: US 7,630,454 B2
(45) Date of Patent: Dec. 8, 2009

(54) FREQUENCY-DIVISION MULTIPLEXING TRANSCEIVER APPARATUS AND METHOD

(75) Inventor: Toshio Kawasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 482 days.

(21) Appl. No.: 11/476,694

(22) Filed: Jun. 29, 2006

(65) Prior Publication Data

US 2007/0189415 A1    Aug. 16, 2007

(30) Foreign Application Priority Data

Feb. 15, 2006    (JP)    ............................... 2006-038010

(51) Int. Cl.
*H04L 27/00* (2006.01)
(52) U.S. Cl. .................................... 375/295
(58) Field of Classification Search .................. 375/295, 375/146
See application file for complete search history.

(56) References Cited

U.S. PATENT DOCUMENTS

| | | | |
|---|---|---|---|
| 6,459,723 B1 * | 10/2002 | Kim et al. .................... | 375/146 |
| 2004/0156386 A1 | 8/2004 | Atarashi et al. | |
| 2008/0225895 A1 * | 9/2008 | Lee et al. .................... | 370/483 |

FOREIGN PATENT DOCUMENTS

WO    WO 99/59265    11/1999
WO    WO 2007/024089    3/2007

OTHER PUBLICATIONS

Goto et al. ( "Variable Spreading and Chip repetition Factors (VSCRF) -CDMA in Reverse Link for Broadband Packet Wireless Access" IEICE Transactions on Communications, Communications Society, Tokyo, JP, vol. E88-B, No. 2, Feb. 2005, pp. 509-519, XP001225513 ISSN: 09i 6-8516).*
Y. Goto et al.; "Variable Spreading And Chip Repetition Factors (VSCRF)-CDMA In Reverse Link For Broadband Packet Wireless Access"; IEICE Transactions on Communications, Communications Society, Tokyo, Japan, vol. E88-B, No. 2, Feb. 2005 pp. 509-519.
European Search Report dated Jun. 15, 2007; Application No. 06013116.6-2411.

* cited by examiner

*Primary Examiner*—Chieh M Fan
*Assistant Examiner*—Jaison Joseph
(74) *Attorney, Agent, or Firm*—Myers Wolin, LLC

(57) ABSTRACT

In a frequency-division multiplexing transmission apparatus for transmitting data in a frequency spectrum specific to a mobile station, a chip-dividing unit divides each symbol of a transmission-symbol sequence into chips; a first phase rotation unit performs $\pi/2$ phase rotation for the odd-numbered chips of the divided chips; a chip-repetition and rearrangement unit compresses the time domains of each chip of the chip sequence after phase rotation, then repeats the chips a specified number of times and rearranges the chips of the obtained repetitive-chip sequences so that they have the same arrangement as the original chip sequence; a second phase rotation unit performs phase rotation that changes at a speed specific to a mobile station for each chip of the rearranged repetitive-chip sequence; and a transmission unit transmits said phase-rotated chips.

14 Claims, 27 Drawing Sheets

FIG. 1
(A)
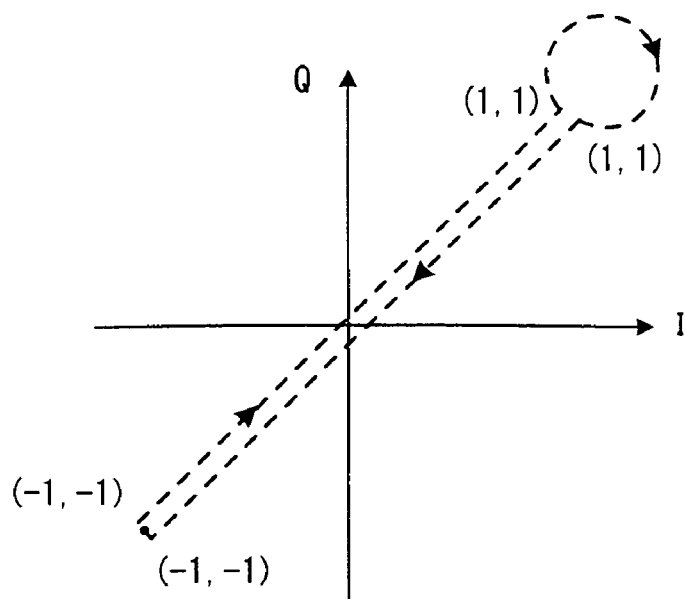
(B)
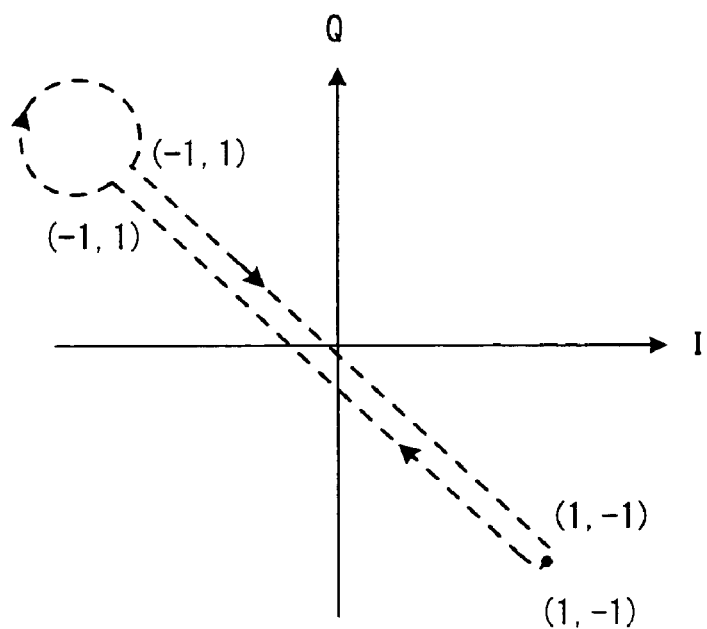

FIG. 5

| |
|---|
| C_0 = S0 |
| C_1 = S0 × exp( j (π/2)) × exp( j (π/2)) = S0 × exp( j (π/2)) |
| C_2 = S1 × exp( j (2π/2)) |
| C_3 = S1 × exp( j (π/2)) × exp( j (3π/2)) = S1 × exp( j (4π/2)) |
| C_4 = S0 × exp( j (4π/2)) |
| C_5 = S0 × exp( j (π/2)) × exp( j (5π/2)) = S0 × exp( j (6π/2)) |
| C_6 = S1 × exp( j (6π/2)) |
| C_7 = S1 × exp( j (π/2)) × exp( j (7π/2)) = S1 × exp( j (8π/2)) |

FIG. 9

| |
|---|
| C_0 = S0 |
| C_1 = S0' = S0 × exp( j (π/2)) |
| C_2 = S1 |
| C_3 = S1' = S1 × exp( j (π/2)) |
| C_4 = S0 × exp( j (4π/4)) |
| C_5 = S0' × exp( j (4π/4)) = S0 × exp( j (3π/2)) |
| C_6 = S1 × exp( j (4π/4)) |
| C_7 = S1' × exp( j (4π/4)) = S1 × exp( j (3π/2)) |
| C_8 = S0 × exp( j (8π/4)) |
| C_9 = S0' × exp( j (8π/4)) = S0 × exp( j (1π/2)) |
| C_10 = S1 × exp( j (8π/4)) |
| C_11 = S1' × exp( j (8π/4)) = S1 × exp( j (π/2)) |
| C_12 = S0 × exp( j (12π/4)) |
| C_13 = S0' × exp( j (12π/4)) = S0 × exp( j (3π/2)) |
| C_14 = S1 × exp( j (12π/4)) |
| C_15 = S1' × exp( j (12π/4)) = S1 × exp( j (3π/2)) |

FIG. 15

| |
|---|
| C_0 = S0 |
| C_1 = S0' = S0 × exp( j ($\pi$/2)) |
| C_2 = S1 |
| C_3 = S1' = S1 × exp( j ($\pi$/2)) |
| C_4 = S0 × exp( j (4$\pi$/4)) |
| C_5 = S0' × exp( j (4$\pi$/4)) = S0 × exp( j (3$\pi$/2)) |
| C_6 = S1 × exp( j (4$\pi$/4)) |
| C_7 = S1' × exp( j (4$\pi$/4)) = S1 × exp( j (3$\pi$/2)) |
| C_8 = S0 × exp( j (8$\pi$/4)) |
| C_9 = S0' × exp( j (8$\pi$/4)) = S0 × exp( j (1$\pi$/2)) |
| C_10 = S1 × exp( j (8$\pi$/4)) |
| C_11 = S1' × exp( j (8$\pi$/4)) = S1 × exp( j ($\pi$/2)) |
| C_12 = S0 × exp( j (12$\pi$/4)) |
| C_13 = S0' × exp( j (12$\pi$/4)) = S0 × exp( j (3$\pi$/2)) |
| C_14 = S1 × exp( j (12$\pi$/4)) |
| C_15 = S1' × exp( j (12$\pi$/4)) = S1 × exp( j (3$\pi$/2)) |

FIG. 19

| |
|---|
| $C\_0 = S0 \times \exp(j(n \times \pi/2))$ |
| $C\_1 = S0 \times \exp(j(n \times \pi/2)) \times \exp(\pm j(\pi/2))$ |
| $C\_2 = S1 \times \exp(j(n \times \pi/2))$ |
| $C\_3 = S1 \times \exp(j(n \times \pi/2)) \times \exp(\pm j(\pi/2))$ |
| $C\_4 = S0 \times \exp(j(n \times \pi/2)) \times \exp(j(4\pi/4))$ |
| $C\_5 = S0 \times \exp(j(n \times \pi/2)) \times \exp(\pm j(\pi/2)) \times \exp(j(4\pi/4))$ |
| $C\_6 = S1 \times \exp(j(n \times \pi/2)) \times \exp(j(4\pi/4))$ |
| $C\_7 = S1 \times \exp(j(n \times \pi/2)) \times \exp(\pm j(\pi/2)) \times \exp(j(4\pi/4))$ |
| $C\_8 = S0 \times \exp(j(n \times \pi/2)) \times \exp(j(8\pi/4))$ |
| $C\_9 = S0 \times \exp(j(n \times \pi/2)) \times \exp(\pm j(\pi/2)) \times \exp(j(8\pi/4))$ |
| $C\_10 = S1 \times \exp(j(n \times \pi/2)) \times \exp(j(8\pi/4))$ |
| $C\_11 = S1 \times \exp(j(n \times \pi/2)) \times \exp(\pm j(\pi/2)) \times \exp(j(8\pi/4))$ |
| $C\_12 = S0 \times \exp(j(n \times \pi/2)) \times \exp(j(12\pi/4))$ |
| $C\_13 = S0 \times \exp(j(n \times \pi/2)) \times \exp(\pm j(\pi/2)) \times \exp(j(12\pi/4))$ |
| $C\_14 = S1 \times \exp(j(n \times \pi/2)) \times \exp(j(12\pi/4))$ |
| $C\_15 = S1 \times \exp(j(n \times \pi/2)) \times \exp(\pm j(\pi/2)) \times \exp(j(12\pi/4))$ |

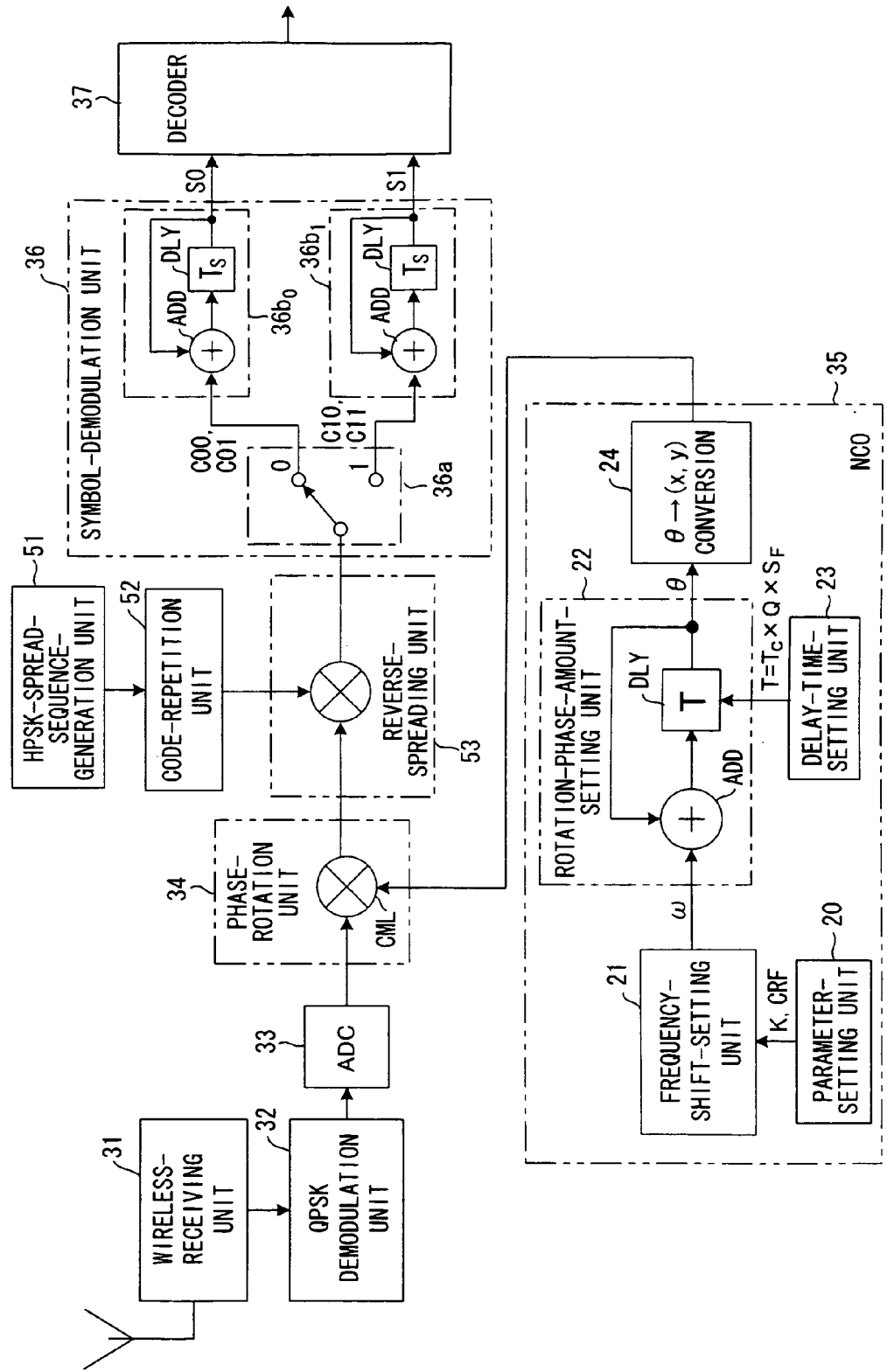

FREQUENCY-DIVISION MULTIPLEXING TRANSCEIVER APPARATUS AND METHOD

BACKGROUND OF THE INVENTION

This invention relates to a frequency-division multiplexing transceiver apparatus and method for sending and receiving data by a mobile-station-specific frequency spectrum, and more particularly to a frequency-division multiplexing transceiver apparatus and method for transmitting a transmission symbol upon subjecting the symbol to phase rotation that varies at a speed specific to the mobile station.

DS-CDMA (Direct Sequence-Code Division Multiple Access) multiplies a narrow-band transmission signal by a spreading code in order to spread and transmit that transmission signal over a wider band. In DS-CDMA, when each of a plurality of mobile stations sends a transmission signal upon multiplying it by a spreading code having a certain spreading factor SF, the information transmission speed becomes 1/SF. Therefore, in order to achieve a frequency utilization efficiency that is equivalent to that of TDMA, it is necessary in DS-CDMA to accommodate a number of signals that is equal to SF number of mobile stations. However, in an actual wireless propagation environment on the uplink, the effect of Multiple Access Interference (MAI), in which the signals from each of the mobile stations interfere with each other, becomes dominant due to differences in propagation conditions from each mobile station to the base station, for example, due to differences in propagation-delay time or propagation-path fluctuation, and thus the rate of frequency utilization decreases.

Therefore, IFDMA (Interleaved Frequency Division Multiple Access) is being studied as a wireless modulation method that is capable of reducing the effects of MAI in next-generation mobile communications (see the specification of JP2004-297756 A, and "Investigations on Packet Error Rate of Variable Spreading and Chip Repetition Factors (VSCRF)-CDMA Wireless Access in Reverse Link Multicell Environment", The Institute of Electronics, Information and Communication Engineers Technical Report of IEICE, RCS2004-84 (204-206)). This IFDMA modulation method transmits a transmission signal upon multiplying the signal by a phase that changes at a speed specific to the mobile station, thereby reducing MAI by placing the signals from each of the mobile stations on a frequency axis in such a manner that the signals will not overlap each other on the frequency axis.

FIG. 21 is a block diagram showing the structure of a mobile station that uses an IFDMA modulation method, and FIG. 22 is a drawing that explains an IFDMA symbol. A channel encoder $1a$ performs channel encoding by applying error-correction encoding such as turbo encoding or convolutional encoding to an entered binary information sequence, and a data modulator $1b$ converts the channel-encoded data to I, Q complex components (symbols) in QPSK, for example. A symbol transmitted in one frame of IFDMA is referred to as an "IFDMA symbol", and one IFDMA symbol is composed of Q-number of symbols S0, S1, S2, S3 as shown in (a) of FIG. 22 (Q=4 in the figure).

A symbol-repetition and rearrangement unit $1c$ compresses the time domains of the four symbols S0, S1, S2 and S3 of the IFDMA symbol, and repeatedly generates each symbol L times (L=4 in the figure), as well as rearranges the repeatedly generated symbols and places them in the same arrangement as that of the symbol sequence S0, S1, S2, S3 (see (b) of FIG. 22). By taking Tc to be the sample period, the period Ts of symbol-repetition will satisfy the relation Ts=Tc×Q. A phase-rotation unit $1d$ has a complex multiplier CML that performs mobile-station specific phase rotation of each symbol in the repetitive symbol sequence (see (c) of FIG. 22), and a wireless transmitter $1e$ performs up-conversion of the signal that is input from the phase-rotation unit $1d$ from baseband frequency to radio frequency, after which it amplifies the signal and transmits it from an antenna.

When the time domains of the transmission-symbol sequence S0, S1, S2, S3 are compressed and each transmission symbol is repeatedly generated a prescribed number of times (L times), and each of the symbols of the repetitive-symbol sequence are rearranged so as to have the same arrangement as that of the symbol sequence S0, S1, S2, S3, the repetitive-symbol sequence after rearrangement will have a comb-tooth-shaped frequency spectrum as shown in (a) of FIG. 23. Also, by performing phase rotation that varies at a speed that is specific to the mobile station of each of the symbols of the rearranged repetitive-symbol sequence, the spectral positions of the comb-tooth-shaped frequency spectrum shift as shown in (a) to (d) of FIG. 23, and frequency-division multiplex transmission becomes possible. In other words, when the speed of phase rotation is zero, the frequency spectrum of the output signal from the phase-rotation unit $1d$ will have comb-tooth-shaped frequency spectrum characteristics as shown in (a) of FIG. 23, and as the amount of change in the phase rotation per unit time Tc (frequency) increases, the frequency spectrum will shift as shown in (a) to (d) of FIG. 23.

An NCO (Numerically Controlled Oscillator) $1g$ calculates the amount of phase rotation θ per unit time Tc, and the complex multiplier of the phase-rotation unit $1d$ performs phase rotation specific to the mobile station for each symbol of the repetitive-symbol sequence and executes frequency shift processing.

The phase $\theta_k(t)$ that is output from the NCO $1g$ after repeating Q-number of symbols L times is given by the following equation:

$$\theta_k(t) = k \cdot 2\pi \frac{W}{L} \cdot t = k \cdot 2\pi \frac{1}{L \cdot Q \cdot Tc} \cdot t \quad (1)$$

$$W = \frac{1}{Ts}$$

$$QW = \frac{1}{Tc}$$

where W is the symbol frequency, and k is a value that corresponds to the mobile station and is any one value among 0, 1, 2, ... L−1. NCO $1g$ outputs the phase $\theta_k(t)$ as θ, which has been calculated according to Equation (1), at the period Tc, and is so adapted that the amount of phase rotation will be 2π at the IFDMA period (=L·Q·Tc=16 Tc) (such that the phase will make one full cycle).

In NCO $1g$, a frequency-shift-setting unit $1h$ sets the amount of change of phase rotation per unit time Tc (angular speed) Δω, and using the parameters k, L and Q, calculates the angular speed Δω according to the following equations:

$$\Delta\omega = k \cdot 2\pi \frac{W}{L} = k \cdot 2\pi \frac{1}{L \cdot Q} \quad (2)$$

$$f = \frac{\Delta\omega}{2\pi \cdot Tc} = \frac{k}{L \cdot Q \cdot Tc}$$

A rotation-phase-amount-setting unit $1i$ comprises an adder ADD and a delay unit DLY for applying a delay time T (=Tc), and performs a calculation according to the following equation every unit time Tc to increase the rotation phase θ by Δω at a time and output the result.

$$\theta = \theta + \Delta\omega \quad (3)$$

A converter $1j$ calculates I, Q components (x, y) in a complex plane of the rotation phase-amount θ and inputs these components to the phase-rotation unit $1d$. By taking the symbols of the repetitive-symbol sequence to be S (=X+jY), the phase-rotation unit $1d$ performs a calculation according to the following equation and outputs the calculation result.

$$(X+jY)\cdot(x+jy)$$

In actuality, the complex multiplier CML of the phase-rotation unit $1d$ calculates and outputs (Xx−Yy) and (Xy+Yx) for each real-number and imaginary-number part.

If k=0, the amount of change in phase rotation will be zero (Δω=0), and the frequency spectrum will become as shown in (a) of FIG. 23. If k=1, the amount of change in phase rotation will become Δω=2π/L×Q according to Equation (2), and if Q=L=4, then the phase will change in increments of π/8 as shown in (c) of FIG. 24, and the frequency spectrum will become as shown in (d) of FIG. 24 or (b) of FIG. 23. Also, if k=2, the amount of change in phase rotation will become Δω=4π/L×Q according to Equation (2). If Q=L=4, then the phase will change in increments of π/4 for each Tc, and the frequency spectrum will become as shown in (c) of FIG. 23. Moreover, if k=3, then the amount of change in phase rotation will become Δω=6π/L×Q according to Equation (2). If Q=L=4, then the phase will change in increments of 3π/8 for each Tc, and the frequency spectrum will become as shown in (d) of FIG. 23. As a result, even when a plurality of mobile stations access the same base station simultaneously, the frequency spectrum of each mobile station will be orthogonal on the frequency axis, and it is possible to reduce interference among transmission signals.

FIG. 25 is a block diagram showing different structure of a mobile station that uses an IFDMA modulation method, and FIG. 26 is a drawing that explains an IFDMA symbol. The mobile station shown in FIG. 25 spreads the transmission symbols using a spreading code, and the phase of the chip-repetitive sequence that is obtained by compressing and repeating the time domains of the spread chip sequence obtained by spreading is rotated at each unit time Tc.

A channel encoder $1a$ performs channel encoding by applying error-correction encoding such as turbo encoding or convolutional encoding to an entered binary information sequence, and a data modulator $1b$ converts the channel-encoded data to I, Q complex components (symbols) in QPSK, for example. One IFDMA symbol is composed of Q-number of symbols as shown in (a) of FIG. 26 (Q=2 in the figure).

A spreading-code-multiplier $1m$ multiplies the symbols S0, S1 with the spreading code c00, c01, c10, c11 of the spreading factor (SF=2 in the figure) to generate a spread chip sequence (see (b) of FIG. 26). As a result, one IFDMA symbol is composed of Q×SF (=4) chips C00, C01, C10, C11.

A chip-repetition unit $1n$ compresses the time domains of the four chips C00, C01, C10, C11 of the spread chip sequence, and repeats each chip CRF times (CRF=4 in the figure), then rearranges the chip-repetitive sequence so that it has the same arrangement as the original chip sequence C00, C01, C10, C11 (see (c) and (d) of FIG. 26). Here, CRF is an abbreviation for Chip Repetition Factor. Taking Tc to be the chip repetition period, the period Ts of the repetitive-chip sequence becomes Ts=Tc×Q×SF.

A phase-rotation unit $1d$ has a complex multiplier CML that performs mobile-station specific phase rotation of the chip-repetitive sequence (see (e) of FIG. 26), and a wireless transmitter $1e$ performs up-conversion of the signal that is input from the phase-rotation unit $1d$ from baseband frequency to radio frequency, after which it amplifies the signal and transmits it from an antenna.

When the speed of phase rotation is zero, the frequency spectrum of the signal output from the phase-rotation unit $1d$ has the frequency-spectrum characteristics as shown in (a) of FIG. 23, and as the amount of change in phase rotation per unit time Tc (frequency) becomes large, the frequency spectrum shifts as shown in (a) to (d) of FIG. 23.

An NCO (Numerically Controlled Oscillator) $1g$ calculates the amount of phase rotation θ per unit time Tc, and the complex multiplier CML of the phase-rotation unit $1d$ performs phase rotation specific to the mobile station for each chip of the repetitive-chip sequence and executes frequency shift processing.

The phase $\theta_k(t)$ that is output from the NCO $1g$ is given by the following equation:

$$\theta_k(t) = k \cdot 2\pi \frac{W}{CRF} \cdot t = k \cdot 2\pi \frac{1}{CRF \cdot SF \cdot Q \cdot Tc} \cdot t \quad (4)$$

$$W = \frac{1}{Ts}$$

$$SF \cdot Q \cdot W = \frac{1}{Tc}$$

where k is a value that corresponds to the mobile station and is any one value among 0, 1, 2, . . . CRF−1. NCO $1g$ outputs the phase $\theta_k(t)$ which has been calculated according to Equation (4), at the period Tc, and is so adapted that the amount of phase rotation will be 2π at the IFDMA period (=16 Tc) (such that the phase will make one full cycle).

In NCO $1g$, a frequency-shift-setting unit $1h$ sets the amount of change of phase rotation per unit time Tc (angular speed) Δω, and using the parameters k, CRF, Q and SF calculates the angular speed Δω according to the following equations:

$$\Delta\omega = k \cdot 2\pi \frac{W}{CRF} = k \cdot 2\pi \frac{1}{CRF \cdot SF \cdot Q} \quad (5)$$

$$f = \frac{\Delta\omega}{2\pi Tc} = \frac{k}{CRF \cdot SF \cdot Q \cdot Tc}$$

A rotation-phase-amount-setting unit $1i$ comprises an adder ADD and a delay unit DLY for applying a delay time T (=Tc), and performs a calculation according to the following equation every unit time Tc to increase the rotation phase θ by Δω at a time and outputs the result.

$$\theta = \theta + \Delta\omega \quad (6)$$

A converter $1j$ calculates I, Q components (x, y) in a complex plane of the rotation phase amount θ and inputs these components to the phase-rotation unit $1d$. The phase-rotation unit $1d$ performs phase rotation specific to the mobile station for each chip of the repetitive-chip sequence, and performs frequency-shift processing.

If k=0, the amount of change in phase rotation will be zero (Δω=0), and the frequency spectrum will become as shown in (a) of FIG. 23. If k=1, the amount of change in phase rotation will become Δω=2π/CRF×SF×Q according to Equation (5), and if Q=SF=2, and CRF=4, then the phase will change in increments of π/8 and the frequency spectrum will become as shown (b) of FIG. 23. Also, if k=2, the amount of change in phase rotation will become Δω=4π/CRF×SF×Q according to Equation (5). If Q=SF=2 and CRF=4, then the phase will change in increments of π/4 for each Tc, and the frequency spectrum will become as shown in (c) of FIG. 23. Moreover, if k=3, then the amount of change in phase rotation will become Δω=6π/CRF×SF×Q according to Equation (5). If Q=SF=2 and CRF=4, then the phase will change in increments of 3π/8 for each Tc, and the frequency spectrum will become as shown in (d) of FIG. 23. As a result, even when a plurality of mobile stations access the same base station simultaneously, the frequency spectrum of each mobile station will be orthogonal on the frequency axis, and it is possible to reduce interference among transmission signals.

A mobile station is normally battery operated, and in order to lengthen the possible communication time, it is desired that the efficiency of the transmission amplifier in the wireless unit be increased. Also, in order that the transmission signal is not distorted by the transmission amplifier, linear characteristics are desired. The input/output characteristics of the transmission amplifier show linear characteristics when the input power is low as shown in FIG. 27, however, as the input power increases, the input/output characteristics become non-linear when the input power becomes Pmax or greater, as shown by the dotted line. When the input power becomes Pmax or greater, non-linear distortion occurs due to this non-linear characteristic.

As operation point approaches Pmax, in order to use the transmission amplifier with high efficiency, the input power exceeds Pmax and distortion occurs when the transmission signal is large, however, when operation point is decreased so that distortion does not occur, the efficiency of the transmission amplifier drops. In order to satisfy these conflicting needs, it is important that the PAPR (Peak to Average Power Ratio) of the transmission signal be made small. PAPR is the ratio between the peak power value and average power value of the transmission signal. When PAPR is large, the signal that is output from the amplifier becomes distorted when the operation point of the amplifier approaches Pmax and the transmission signal is at a peak, and when PAPR is small, the signal that is output from the amplifier does not become distorted when the transmission signal is at a peak, and it is possible to use the amplifier efficiently.

There is prior art whose object is to reduce the peak factor in the CDMA modulation method (see the specification of JP2005-57582 A). In this prior art, when a multiplexed CDMA signal exceeds the input-limit of the transmission amplifier, power control is performed for data symbol near a specified symbol location in I-Q complex plane, and power-level control is performed, taking into consideration the symbol rate of the user and required SIR.

However, in this prior art, the PAPR of the transmission signal is not reduced in the IFDMA modulation method.

Technical Report of IEICE, RCS2004-84 (204-206)

[Non-patent Document 1] Goto, et al., "Investigations on Packet Error Rate of Variable Spreading and Chip Repetition Factors (VSCRF)-CDMA Wireless Access in Reverse Link Multi-cell Environment", The Institute of Electronics, Information and Communication Engineers,

SUMMARY OF THE INVENTION

Accordingly, an object of the present invention is to reduce the PAPR of a transmission signal in the IFDMA modulation system.

Another object of the present invention is to use a transmission amplifier efficiently without the occurrence of distortion by reducing the PAPR of a transmission signal.

First Frequency-division Multiplexing Transceiver Apparatus and Method

A first frequency-division multiplexing transmission apparatus of the present invention transmits data in a frequency spectrum specific to a mobile station, and comprises: a chip-dividing unit, a first phase rotation unit, a chip-repetition and rearrangement unit, a second phase rotation unit, and a transmission unit. The chip-dividing unit divides each symbol of a transmission-symbol sequence into chips; the first rotation unit performs π/2 or −π/2 phase rotation for the even-numbered or odd-numbered chips of the divided chips; the chip-repetition and rearrangement unit compresses the time domains of each chip of the chip sequence after phase rotation, then repeats the chips a specified number of times (CRF times) and rearranges the chips of the obtained repetitive-chip sequences so that they have the same arrangement as the original chip sequence; the second phase rotation unit performs phase rotation that changes at a speed specific to a mobile station for each chip of the rearranged repetitive-chip sequence; and the transmission unit transmits the-phase-rotated chips.

The second phase rotation unit changes the amount of phase rotation performed for each chip of said repetitive-chip sequence in increments of $k \cdot 2\pi/CRF$ (k is an integer specific to a mobile station) at each period of the repetitive-chip sequence.

The first frequency-division multiplexing receiving apparatus of the invention comprises: a receiving unit, a phase-rotation unit and a demodulation unit. The receiving unit receives each of the chips of the repetitive-chip sequence that are transmitted from the transmission apparatus; the phase-rotation unit performs phase rotation for the received chips that changes in increments of $k \cdot 2\pi/CRF$ (k is an integer specific to a mobile station) at each period of the repetitive-chip sequence for each mobile station; and the demodulation unit performs −π/2 or π/2 phase rotation for the even-numbered or odd-numbered chips of the chip sequence and synthesizes the same chip components that were output from the rotation unit to demodulate the transmission symbols.

Second Frequency-division Multiplexing Transceiver Apparatus and Method

A second frequency-division multiplexing transmission apparatus of the present invention transmits data in a frequency spectrum specific to a mobile station, and comprises: a symbol-repetition and rearrangement unit, a chip-dividing unit, a first phase rotation unit, a second phase rotation unit, and a transmission unit. The symbol-repetition and rearrangement unit compresses the time domains of each symbol of a transmission-symbol sequence, then repeats each of the symbols a specified number of times and rearranges each of the symbols of the obtained repetitive-symbol sequence so that they have the same arrangement as the transmission-symbol sequence; the chip-dividing unit divides the rearranged repetitive symbols into chips; the first phase rotation unit performs π/2 or −π/2 phase rotation for the even-numbered or odd-numbered chips of the divided chip sequence; the second phase rotation unit performs phase rotation that changes at a speed specific to a mobile station for each chip of the phase-rotated chip sequence; and the transmission unit transmits the phase-rotated chips.

The second phase rotation unit changes the amount of phase rotation performed for each chip of said repetitive-chip sequence in increments of $k \cdot 2\pi/\text{CRF}$ (k is an integer specific to a mobile station) at each period of the repetitive-chip sequence.

The second frequency-division multiplexing receiving apparatus of the present invention comprises: a receiving unit, a first phase rotation unit, a second phase rotation unit and a demodulation unit. The receiving unit receives each of the chips of the repetitive-chip sequence that are transmitted from the transmission apparatus; the first phase rotation unit performs phase rotation for the received chips that changes in increments of $k \cdot 2\pi/\text{CRF}$ (k is an integer specific to a mobile station) at each period of the repetitive-chip sequence for each mobile station; the second phase rotation unit performs $-\pi/2$ or $\pi/2$ phase rotation for the even-numbered or odd-numbered chips of the repetitive-chip sequence; and the demodulation unit synthesizes the same chip components that are output from the second phase rotation unit to demodulate the transmission symbols.

Third Frequency-division Multiplexing Transceiver Apparatus and Method

A third frequency-division multiplexing transmission apparatus of the present invention transmits data in a frequency spectrum specific to a mobile station, and comprises: a spreading-code-generation unit, a spreading unit, a chip-repetition and rearrangement unit, a phase-rotation unit, and a transmission unit. The spreading-code-generation unit generates a repeating spreading code in which the phase difference between adjacent spreading code alternates between $\pm\pi/2$ and $m \cdot \pi/2$ (m is an integer); the spreading unit multiplies each symbol of a transmission-symbol sequence by the spreading code; the chip-repetition and rearrangement unit compresses the time domains of each chip of a chip sequence obtained from the multiplication, then repeats the chips a specified number of times (CRF times) and rearranges the chips of the obtained repetitive-chip sequences so that it has the same arrangement as the original chip sequence; the phase-rotation unit performs phase rotation that changes at a speed specific to a mobile station for each chip of the rearranged repetitive-chip sequence; and the transmission unit transmits the phase-rotated chips. The phase-rotation unit changes the amount of phase rotation performed for each chip of the repetitive-chip sequence in increments of $k \cdot 2\pi/\text{CRF}$ (k is an integer specific to a mobile station) at each period of the repetitive-chip sequence.

The third frequency-division multiplexing receiving apparatus of the invention comprises: a receiving unit, a phase-rotation unit, a spreading-code-generation unit, a reverse-spreading unit and a demodulation unit. The receiving unit receives each of the chips of the repetitive-chip sequence that are transmitted from the transmission apparatus; the phase-rotation unit performs phase rotation for the received chips that changes in increments of $k \cdot 2\pi/\text{CRF}$ (k is an integer specific to a mobile station) at each period of the repetitive-chip sequence for each mobile station; the spreading-code-generation unit generates spreading code that is the same as the spreading code of the transmission apparatus; the reverse-spreading unit performs a reverse spreading process using the phase-rotated chip sequence and the generated spreading code; and the demodulation unit synthesizes the same symbol components of the chip sequence after reverse spreading to demodulate the transmission symbols.

With the first frequency-division multiplexing transmission apparatus and method of the present invention, each of the symbols of a transmission-symbol sequence is divided into chips, $\pi/2$ or $-\pi/2$ phase rotation is performed for the even-numbered or odd-numbered chips of the divided chips, the time domains of each of the chips of the phase-rotated chip sequence are compressed, the chips are then repeated a specified number of times (CRF times) and the chips of the repetitive-chip sequence are rearranged so that they have the same arrangement as the original chip sequence, phase rotation that changes at a speed specific to a mobile station is performed for each of the chips of the rearranged repetitive-chip sequence, and those phase-rotated chips are transmitted, so it is possible to keep the amount of phase difference between adjacent chips at $\pm\pi/2$ every other one, and by doing so, it is possible to prevent the phase difference between adjacent chips from becoming $\pi$, as well as it is possible to effectively suppress peaks in the transmission signal in the IFDMA modulation method, and to reduce the PAPR.

Also, since the amount of phase rotation that is performed for each chip of the repetitive-chip sequence is made to change in increments of $k \cdot 2\pi/\text{CRF}$ (k is an integer specific to a mobile station) at each period of the repetitive-chip sequence, it is possible to keep the amount of phase difference between adjacent symbols at $\pm\pi/2$ every other one, and to increase the amount that the PAPR is reduced in the transmission signal in the IFDMA modulation system. As a result, it is possible to more efficiently use the transmission amplifier without the occurrence of distortion.

With the first frequency-division multiplexing receiving apparatus and method of the present invention, it is possible to accurately demodulate the transmission symbols that are transmitted according to the transmission method described above.

With the second frequency-division multiplexing transmission apparatus and method of the present invention, the time domains of each of the symbols of transmission-symbol sequence are compressed, those symbols are then repeated a specified number of times (CRF times) and the symbols of the repetitive-symbol sequence are rearranged so that they have the same arrangement as the original transmission-symbol sequence, then each of the symbols of the rearranged repetitive-symbol sequence is divided into chips, $\pi/2$ or $-\pi/2$ phase rotation is performed for the even-numbered or odd-numbered chips of the divided chips, phase rotation that changes at a speed specific to a mobile station is performed for each chip of the phase-rotated chip sequence, and those phase-rotated chips are transmitted, so it is possible to keep the amount of phase difference between adjacent chips at $\pm\pi/2$ every other one, and by doing so, it is possible to prevent the phase difference between adjacent chips from becoming $\pi$, as well as it is possible to effectively suppress peaks in the transmission signal in the IFDMA modulation method, and to reduce the PAPR.

Also, since the amount of phase rotation that is performed for each chip of the repetitive-chip sequence is made to change in increments of $k \cdot 2\pi/\text{CRF}$ (k is an integer specific to a mobile station) at each period of the repetitive-chip sequence, it is possible to keep the amount of phase difference between adjacent symbols at $\pm\pi/2$ every other one, and to increase the amount that the PAPR is reduced in the transmission signal in the IFDMA modulation method. As a result, it is possible to more efficiently use the transmission amplifier without the occurrence of distortion.

With the second frequency-division multiplexing receiving apparatus and method of the present invention, it is possible to accurately demodulate the transmission symbols that are transmitted according to the transmission method described above.

With the third frequency-division multiplexing transmission apparatus and method of the present invention, each symbol of a transmission-symbol sequence is multiplied by a spreading code of which the phase difference between adjacent spreading code alternately repeats between $\pm\pi/2$ and $m\cdot\pi/2$ (m is an integer), the time domains of each of the chips of the chip sequence obtained from this multiplication are compressed, then those chips are repeated a specified number of times (CRF times) and the chips of the obtained repetitive-chip sequence are rearranged so that they have the same arrangement as the original chip sequence, then phase rotation that changes at a speed specific to a mobile station is performed for each of the chips of the rearranged repetitive-chip sequence, so it is possible to keep the amount of phase difference between adjacent chips at $\pm\pi/2$ every other one, and by doing so, it is possible to prevent the phase difference between adjacent chips from becoming $\pi$, as well as it is possible to effectively suppress peaks in the transmission signal in the IFDMA modulation method, and to reduce the PAPR.

Also, since the amount of phase rotation that is performed for each chip of the repetitive-chip sequence is made to change in increments of $k\cdot2\pi/CRF$ (k is an integer specific to a mobile station) at each period of the repetitive-chip sequence, it is possible to keep the amount of phase difference between adjacent symbols at $\pm\pi/2$ every other one, and to increase the amount that the PAPR is reduced in the transmission signal in the IFDMA modulation method. As a result, it is possible to more efficiently use the transmission amplifier without the occurrence of distortion.

With the third frequency-division multiplexing receiving apparatus and method of the present invention, it is possible to accurately demodulate the transmission symbols that are transmitted according to the transmission method described above.

Other features and advantages of the present invention will be apparent from the following description taken in conjunction with the accompanying drawings.

BRIEF DESCRIPTION OF THE DRAWINGS

FIG. 1 is a drawing explaining the theory of the present invention.

FIG. 5 is a drawing explaining the amount of phase rotation that is performed for each symbol.

FIG. 9 is a drawing explaining the amount of phase rotation performed for each chip C0, C1, C2, . . . C15.

FIG. 15 is a drawing explaining the amount of phase rotation performed for each chip C0, C1, C2, . . . C15.

FIG. 19 is a drawing explaining the amount of phase rotation performed for each chip C0, C1, C2, . . . C15.

FIG. 20 is a block diagram of the frequency-division multiplexing receiving apparatus.

DESCRIPTION OF THE PREFERRED EMBODIMENTS

When a channel encoded data sequence is transmitted by converting the encoded data to I, Q complex components (symbols) in QPSK, and when signal points of the symbols in the IQ complex plane shown in (a) of FIG. 1 change as $$(-1, -1) \rightarrow (1, 1) \rightarrow (1, 1) \rightarrow (-1, -1) \tag{A}$$

the peak of the transmission signal that is input to the transmission amplifier becomes large. In other words, when the signal point changes in a diagonal direction as described above, a peak occurs in the transmission signal. Symbol changes for which a peak occurs is not limited to the change described above and a peak will also occur in the case of the changes below.

$$(1, 1) \rightarrow (-1, -1) \rightarrow (-1, -1) \rightarrow (1, 1) \tag{B}$$

$$(1, -1) \rightarrow (-1, 1) \rightarrow (-1, 1) \rightarrow (1, -1) \tag{C}$$

$$(-1, 1) \rightarrow (1, -1) \rightarrow (1, -1) \rightarrow (-1, 1) \tag{D}$$

(B) of FIG. 1 is a drawing explaining the change in the symbol point as given by (C) above. In other words, a peak occurs when the phase between adjacent symbols changes as $\pi \rightarrow 0 \rightarrow \pi$.

Therefore, in this invention, in order that the changes described above do not occur, each symbol of the transmission-symbol sequence is divided into chips, and π/2 or −π/2 phase rotation is performed for the even-numbered or odd-numbered chips of the divided chips so that the phase difference between adjacent chips is ±π/2 every other one, and by doing this the phase difference between chips is prevented as much as possible from becoming π, a peak in the transmission signal is suppressed and PARP is reduced.

(A) First Embodiment

Figure 2:
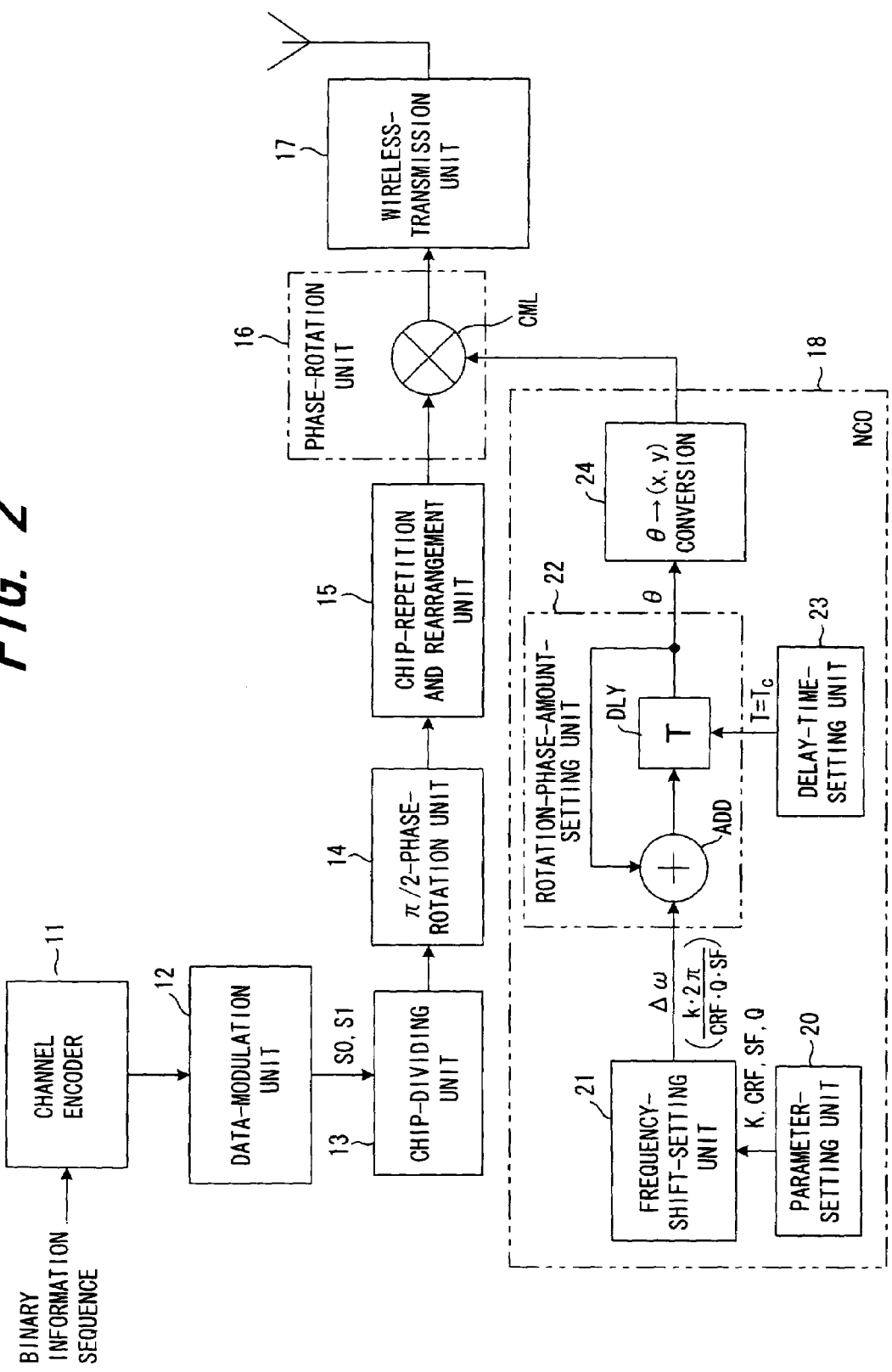
FIG. 2 is a block diagram of the frequency-division multiplexing transmission apparatus according to a first embodiment of the present invention.
Figure 3:
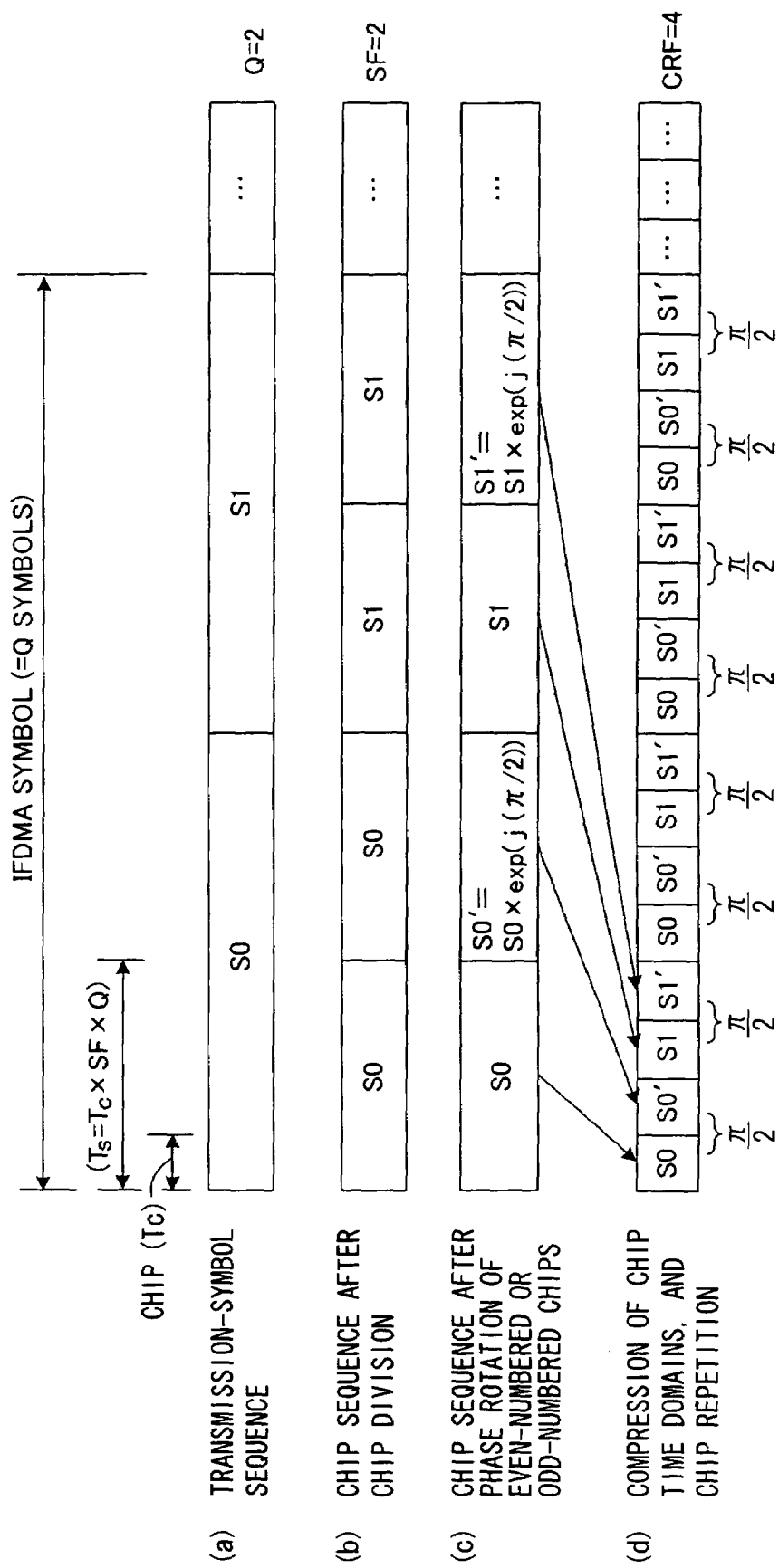
FIG. 3 is a drawing explaining the operation of the frequency-division multiplexing transmission apparatus.

FIG. 2 is a block diagram of the frequency-division multiplexing transmission apparatus of a first embodiment of the present invention, and FIG. 3 is a drawing explaining the operation of the frequency-division multiplexing transmission apparatus. The frequency-division multiplexing transmission apparatus of this first embodiment can be used as a mobile station.

A channel encoder 11 performs channel encoding by applying error-correction encoding such as turbo encoding, or convolutional encoding to the input binary information sequence, and a data-modulation unit 12 converts the channel-encoded data sequence to I, Q complex components (symbols) in QPSK, for example. As shown in (a) of FIG. 3, one IFDMA symbol is composed of Q-number of symbols S0, S1 (Q=2 in the figure).

A chip-dividing unit 13 divides each of the symbols of the transmission-symbol sequence into SF number (SF=2 in the figure) of chips (see (b) of FIG. 3), and a π/2-phase-rotation unit 14 performs π/2 or −π/2 phase rotation for the even-numbered or odd-numbered chips of the divided chip sequence (see (c) of FIG. 3). In the figure, π/2 phase rotation is performed for odd-numbered chips. The mark ' is attached to chips for which phase rotation has been performed.

A chip-repetition and rearrangement unit 15 compresses the time domains of the Q×SF (=4) chips S0, S0', S1, S1' of the chip sequence, and together with repeating each chip CRF times (CRF=4 in the figure), rearranges the repetitive-chip sequence so that it has the same arrangement as the chip sequence S0, S0', S1, S1' (see (d) of FIG. 3). The period Ts of the repetitive-chip sequence has the relationship Ts=Tc×SF×Q.

A phase-rotation unit 16 has a complex multiplier CML that performs phase rotation specific to the mobile station on each chip of the repetitive-chip sequence, and a wireless-transmission unit 17 performs up-conversion of the frequency of the signal input from the phase-rotation unit 16 from a baseband frequency to a radio frequency, then amplifies and transmits the signal from an antenna.

A numerically controlled oscillator (NCO) 18 calculates the amount of phase rotation θ per unit time Tc, and the complex multiplier CML of the phase-rotation unit 16 performs phase rotation specific to the mobile station for each chip of the repetitive-chip sequence and executes processing to shift the frequency.

The NCO 18 has a frequency-shift-setting unit 21 that uses the parameters k, CRF, SF and Q in the portion for setting the amount of change in phase rotation per unit time Tc (angular speed) Δω to calculate the angular speed Δω from Equation (5) and outputs the result. A rotation-phase-amount-setting unit 22 comprises a delay unit DLY, which applies a delay time T (=Tc) that is set by a delay-time-setting unit 23, and an adder ADD, and by performing the operation of Equation (6) for each unit time T, increases the amount of phase rotation θ in increments of Δω and outputs the result. A converter 24 calculates the I, Q components (x, y) in the complex plane of the amount of the phase rotation θ, and inputs these components to the phase-rotation unit 16. With S (=X+jY) as the chips of the repetitive-chips sequence, the phase-rotation unit 16 performs the calculation (X+jY)A·(x+jy), and outputs the calculation results. In actuality, the complex multiplier CML of the phase rotation unit 16 calculates (Xx−Yy), (Xy+Yx) for each real-number and imaginary number part.

In this embodiment, as shown in (d) of FIG. 3, the phase difference between adjacent chips is made to be ±π/2 every other one, and by doing this the phase difference between chips is prevented as much as possible from becoming π, a peak in the transmission signal in the IFDMA modulation method is suppressed, and PARP is reduced.

(B) Second Embodiment

Figure 4:
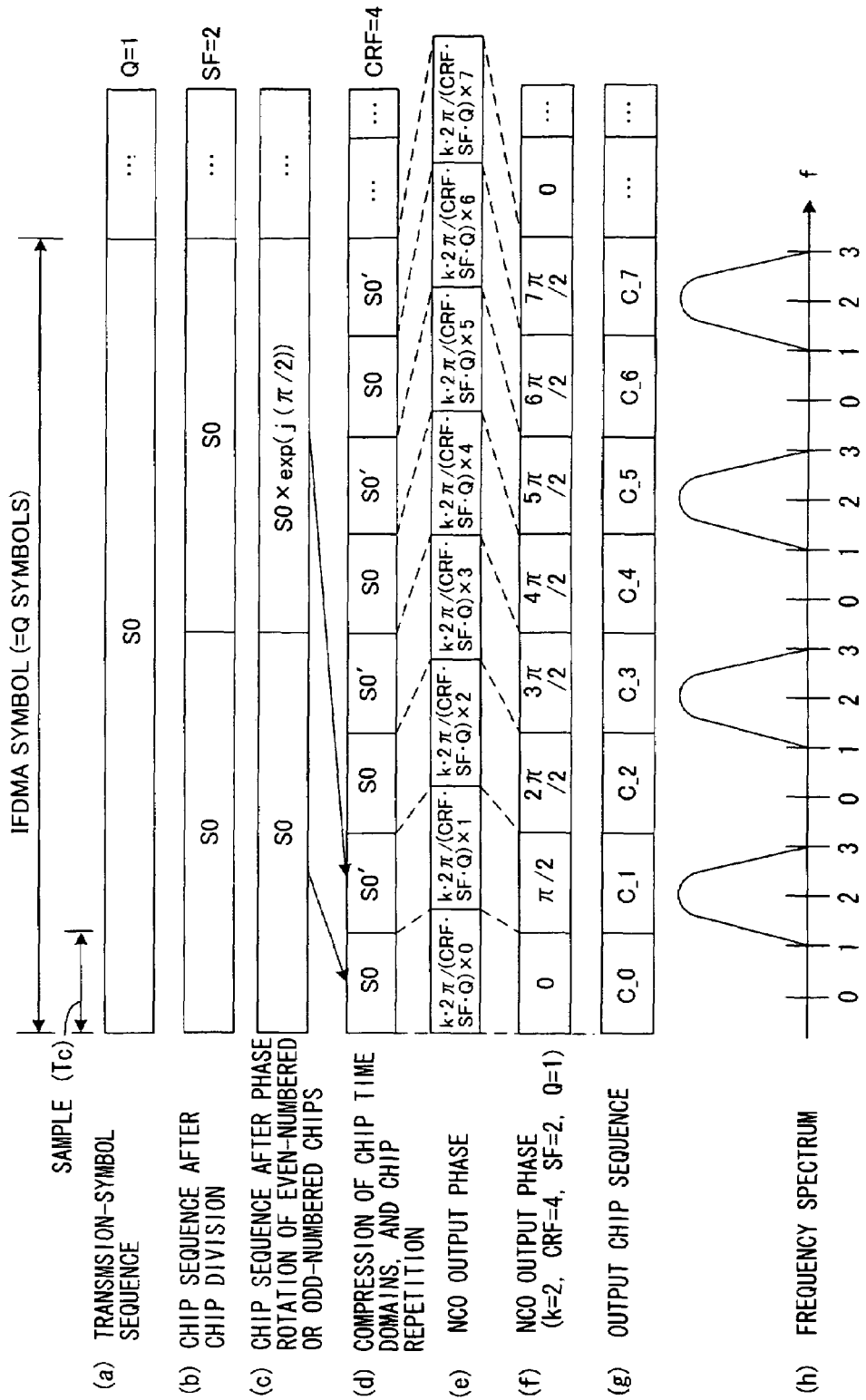
FIG. 4 is a drawing explaining the case when it is not possible to reduce the PAPR by a frequency specific to a mobile station.

In the first embodiment, the phase of the even-numbered or odd-numbered chips in the chip sequence was rotated by π/2 or −π/2 in order to reduce the PAPR. However, in the first embodiment, the phase-rotation unit 16 also performed frequency shift specific to the mobile station. Therefore, depending on the frequency specific to the mobile station, there are cases in which the PAPR cannot be reduced. FIG. 4 is a drawing explaining the operation for these cases, and when Q=1, SF=2 and CRF=4, (a) to (d) of FIG. 4 corresponds to (a) to (d) of FIG. 3.

The amount of phase rotation θ that was performed for each symbol of the repetitive-chip sequence (see (d) of FIG. 4) is given from Equation (6). When Q=1, SF=2, CRF=4 and k=2, the phase-rotation unit 16 performs phase rotation that increases sequentially in increments of π/2 for each chip. As a result, the amount of phase rotation for each chip becomes as shown in (e) and (f) of FIG. 4, and the frequency spectrum becomes as shown in (h) of FIG. 4.

From this, the total amount of phase rotation that is performed by both the π/2-phase-rotation unit 14 and the phase-rotation unit 16 for each chip C0, C1, C2, C3, C4, C5, C6, C7 becomes as shown in FIG. 5. As can be clearly seen from FIG. 5, the amount of phase rotation performed for each symbol is an integer multiple of π. Therefore, depending on the transmission symbols, it is not possible to keep the phase difference between adjacent chips to ±π/2 every other one, and due to this, the number of times that the phase difference between chips becomes π increases, a peak occurs, and it is not possible to effectively reduce the PAPR.

Figure 6:
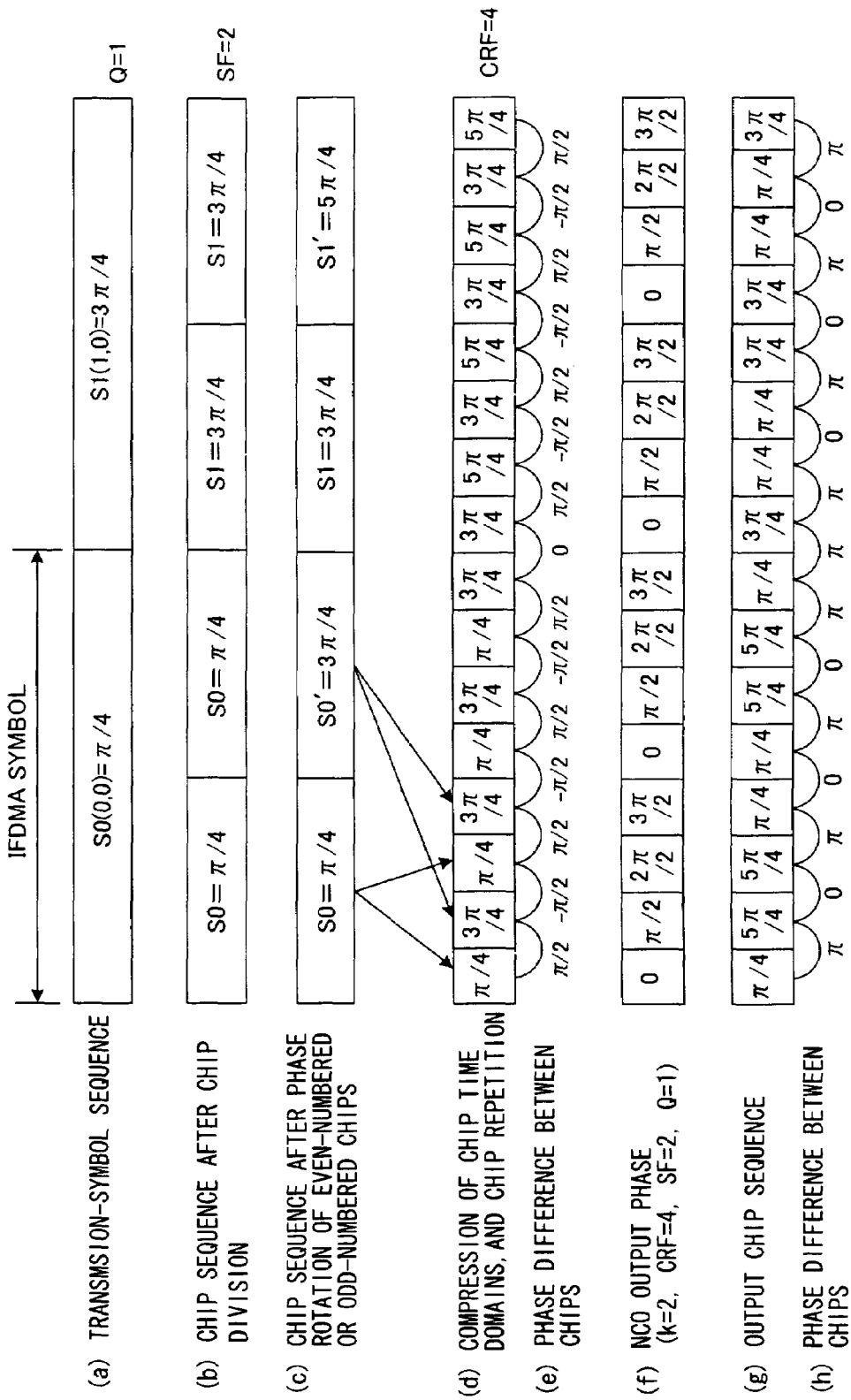
FIG. 6 shows an example in the first embodiment in which the phase difference between adjacent chips does not become $\pm\pi/2$ every other time.

FIG. 6 shows an example of the first embodiment, the phase difference between adjacent chips does not become ±π/2 every other one, where Q=1, SF=2 and CRF=4. As shown in (a) of FIG. 6, when transmission symbol S0 is (0,0)(=π/4) and transmission symbol S1 is (1,0)(=π/4), the phase of each of the chips of the chip sequence after chip division becomes π/4, π/4, 3π/4 and 3π/4 as shown in (b) of FIG. 6.

The π/2-phase-rotation unit 14 performs π/2 rotation for each of the odd-numbered chips, and the phase of the signal points of each chip becomes π/4, 3π/4, 3π/4 and 5π/4 as shown in (c) of FIG. 6.

The chip-repetition and rearrangement unit 15 compresses the time domains of each chip S0, S0', S1, S1', and together with repeating each chip 4 times, rearranges them (see (d) of FIG. 6). At this time, the phase difference between adjacent chips becomes ±π/2 every other one.

When k=2, CRF=4, Q=1 and SF=2, the phase-rotation unit 16 performs phase rotation specific to the mobile station as shown in (f) of FIG. 6 for each chip of the repetitive-chip sequence. As a result, the phase of each chip of the repetitive-chip sequence input to the wireless-transmission unit 17 becomes as shown in (g) of FIG. 6, and as shown in (h) of FIG. 6, the phase difference between adjacent chips does not become ±π/2 every other one, and the case in which the phase difference between adjacent chips changes as π→0→π occurs often, and a peak (overshoot) occurs in the transmission signal.

Taking the above into consideration, in this second embodiment, the phase-rotation unit 16 changes the amount of phase rotation for each chip of the repetitive-chip sequence in increments of k·2π/CRF at each period Ts (=Tc×Q×SF) of the repetitive-chip sequence. Here, k is an integer specific to the mobile station. By doing this, the frequency spectrum changes according to k, and the phase difference between adjacent chips of the repetitive-chip sequence C0, C1, C2, C3, C4, C5, C6, C7 (see (g) of FIG. 4) is kept at ±π/2 every other one.

(a) Frequency-division Multiplexing Transmission Apparatus

Figure 7:
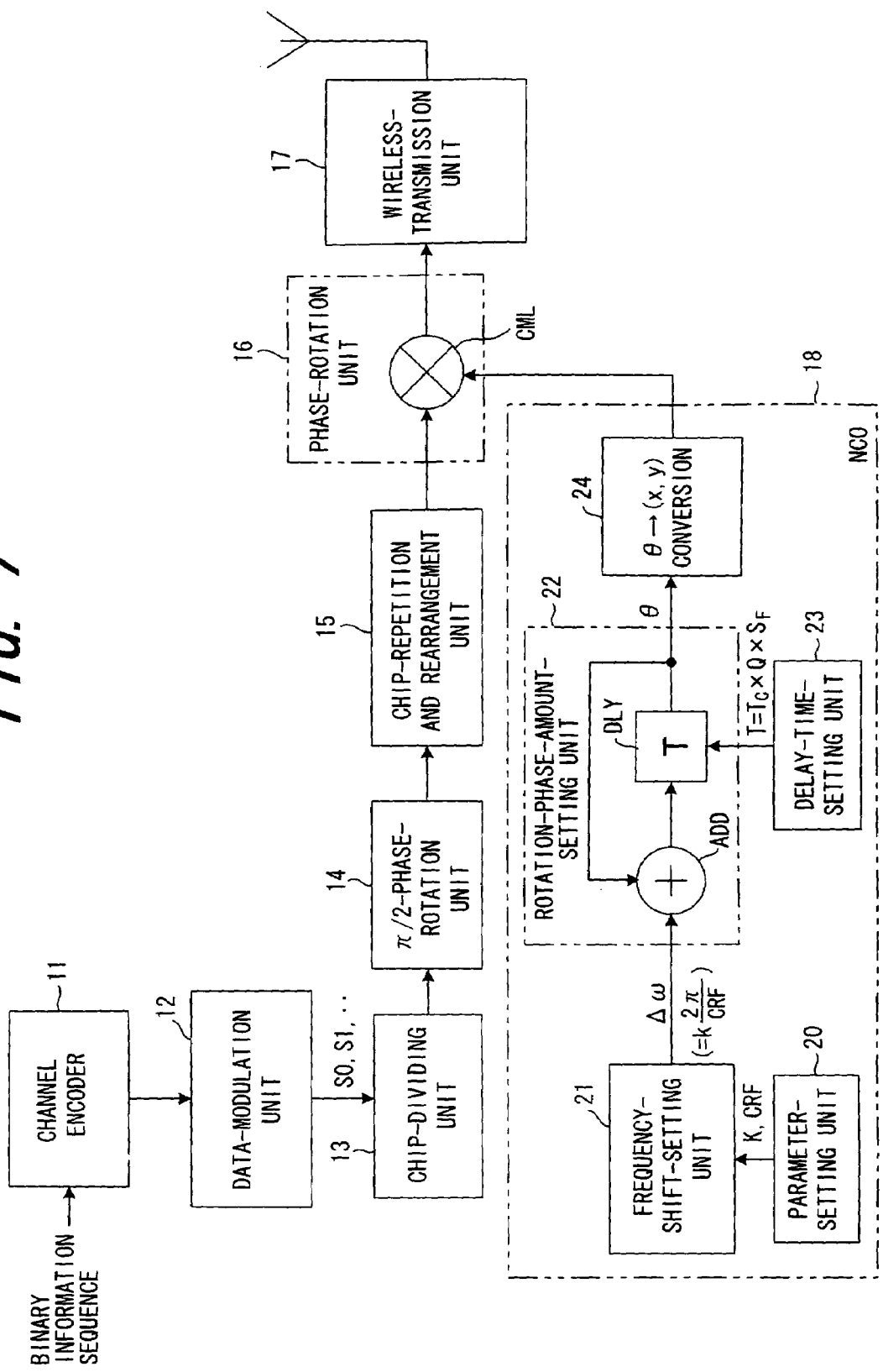
FIG. 7 is a block diagram of the frequency-division multiplexing transmission apparatus according to a second embodiment of the present invention.
Figure 8:
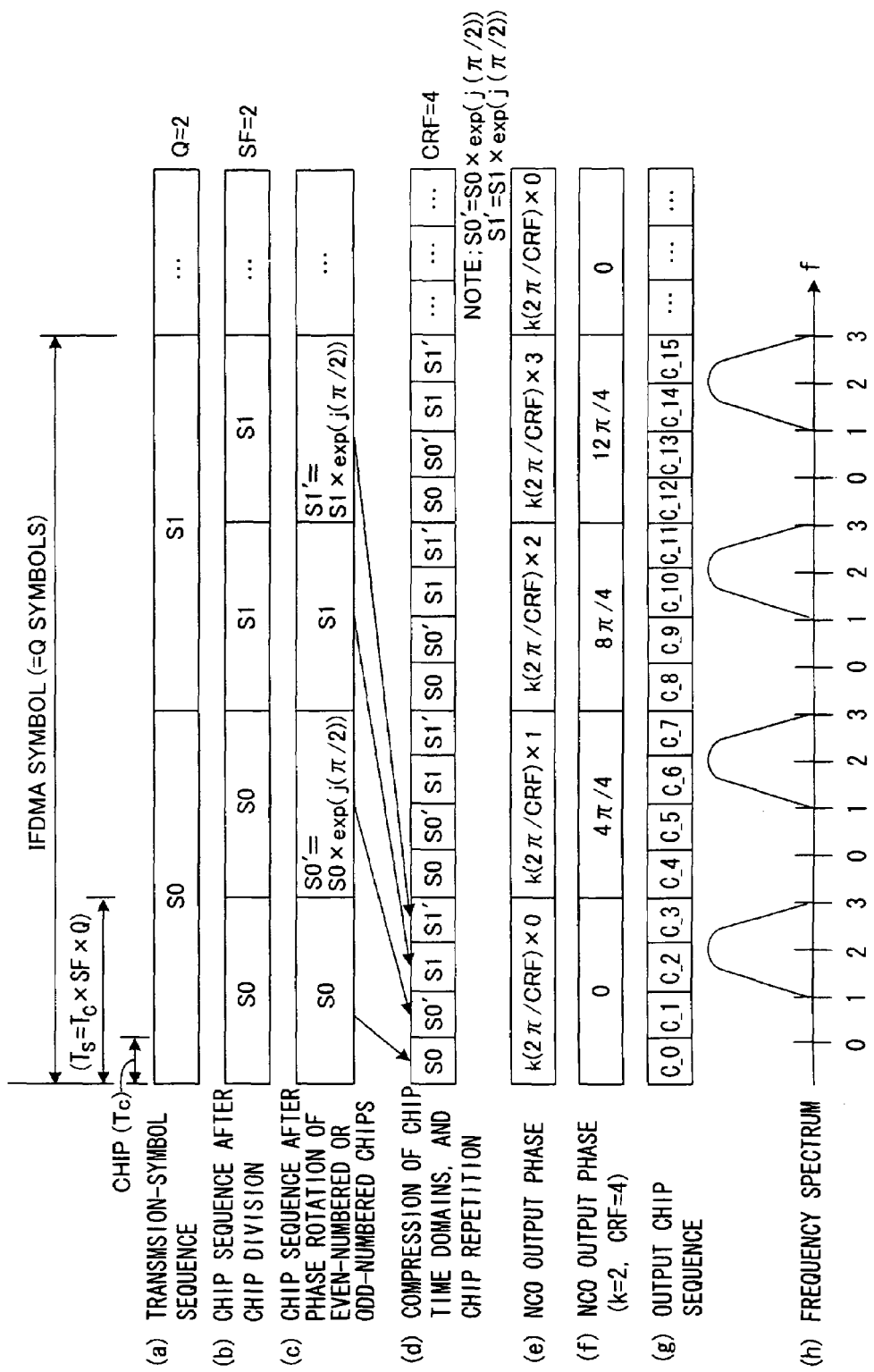
FIG. 8 is a drawing explaining the operation of the frequency-division multiplexing transmission apparatus.

FIG. 7 is a block diagram of the frequency-division multiplexing transmission apparatus of a second embodiment of the present invention, and FIG. 8 is a drawing explaining the operation of the frequency-division multiplexing transmission apparatus, where Q=2, SF=2 and CRF=4.

In FIG. 7, the same reference numbers are applied to parts that are the same as in the first embodiment. This embodiment differs in that the NCO (Numerical Controlled Oscillator) 18 calculates the amount of phase rotation θ for every period Ts (=Tc×Q×SF) of the repetitive-chip sequence, and the complex multiplier CML of the phase-rotation unit 16 performs rotation of that amount θ for each chip of the repetitive-chip sequence and performs frequency-shift processing. The phase $\theta_k(t)$ that is output from the NCO 18 is given by the equation below.

$$\theta_k(t) = k \cdot 2\pi \frac{W}{CRF} \cdot t = k \cdot 2\pi \frac{1}{CRF \cdot Ts} \cdot t \quad (7)$$

Here, k is a value that corresponds to the mobile station, and is any one value among 0, 1, 2, ..., CRF−1, W=1/Ts and Ts=Q×SF×Tc. Therefore, the phase θ that is output from the NCO 18 in increased in increments of k·2π/CRF at each period Ts (=Q×SF×Tc) of the repetitive-chip sequence, and the IFDMA period (=4 Ts) forms one cycle.

The channel encoder 11 performs channel encoding by applying error-correction encoding such as turbo encoding, or convolutional encoding to the input binary information sequence, and the data-modulation unit 12 converts the channel-encoded data sequence to I, Q complex components (symbols) in QPSK, for example. As shown in (a) of FIG. 8, one IFDMA symbol is composed of Q-number of symbols S0, S1 (Q=2 in the figure).

The chip-dividing unit 13 divides each symbol of the transmission-symbol sequence into SF number (SF=2 in the figure) of chips (see (b) of FIG. 8), and a π/2-phase-rotation unit 14 performs π/2 or −π/2 for the even-numbered or odd-numbered chips of the divided chip sequence (see (c) of FIG. 8). In the figure, π/2 phase rotation is performed for the odd-numbered chips. The symbol ' is given to chips for which phase rotation has been performed.

The chip-repetition and rearrangement unit 15 compresses the time domains of the Q×SF (=4) chips S0, S0', S1, S1' of the chip sequence, then repeatedly generates each chip CRF times (=4 times) and rearranges that repetitive-chip sequence so that it has the same arrangement as the chip sequence S0, S0', S1, S1' (see (d) of FIG. 8).

The complex multiplier CML of the phase-rotation unit 16 performs phase rotation specific to the mobile station for each chip of the repetitive-chip sequence. More specifically, the phase-rotation unit 16 changes the amount of phase rotation performed for each chip in increments of k·2π/CRF at each period Ts (=Tc×Q×SF) of the repetitive-chip sequence as shown in (e) of FIG. 8. Here, k is an integer that is specific to the mobile station, and is any one value among 0, 1, 2, ..., CRF−1. The wireless-transmission unit 17 performs up-conversion of the frequency of the signal that is input from the phase-rotation unit 16 from a baseband frequency to a radio frequency, after which it amplifies the signal and transmits it from an antenna.

Figure 23:
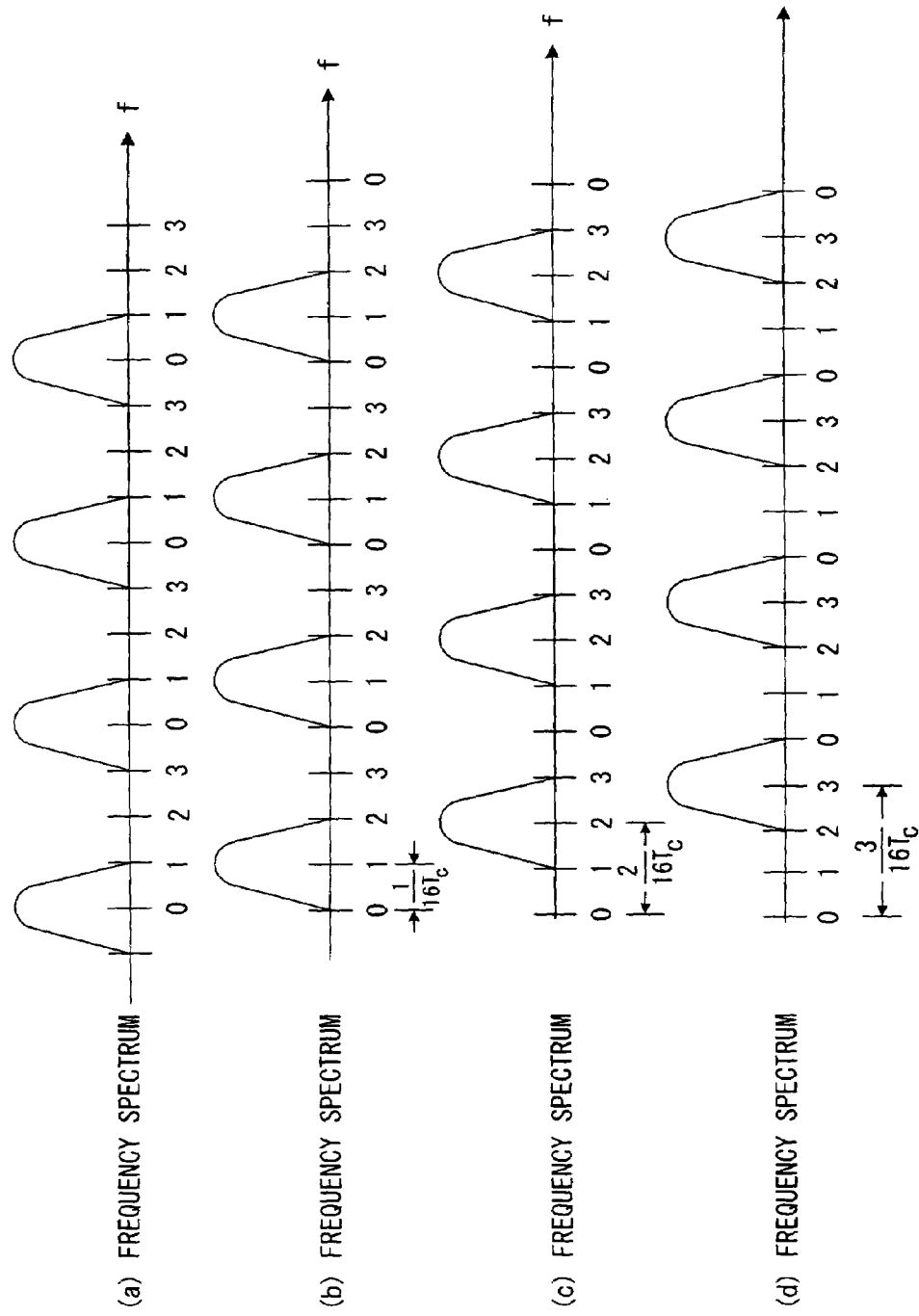
FIG. 23 is a drawing explaining frequency spectrum.
Figure 24:
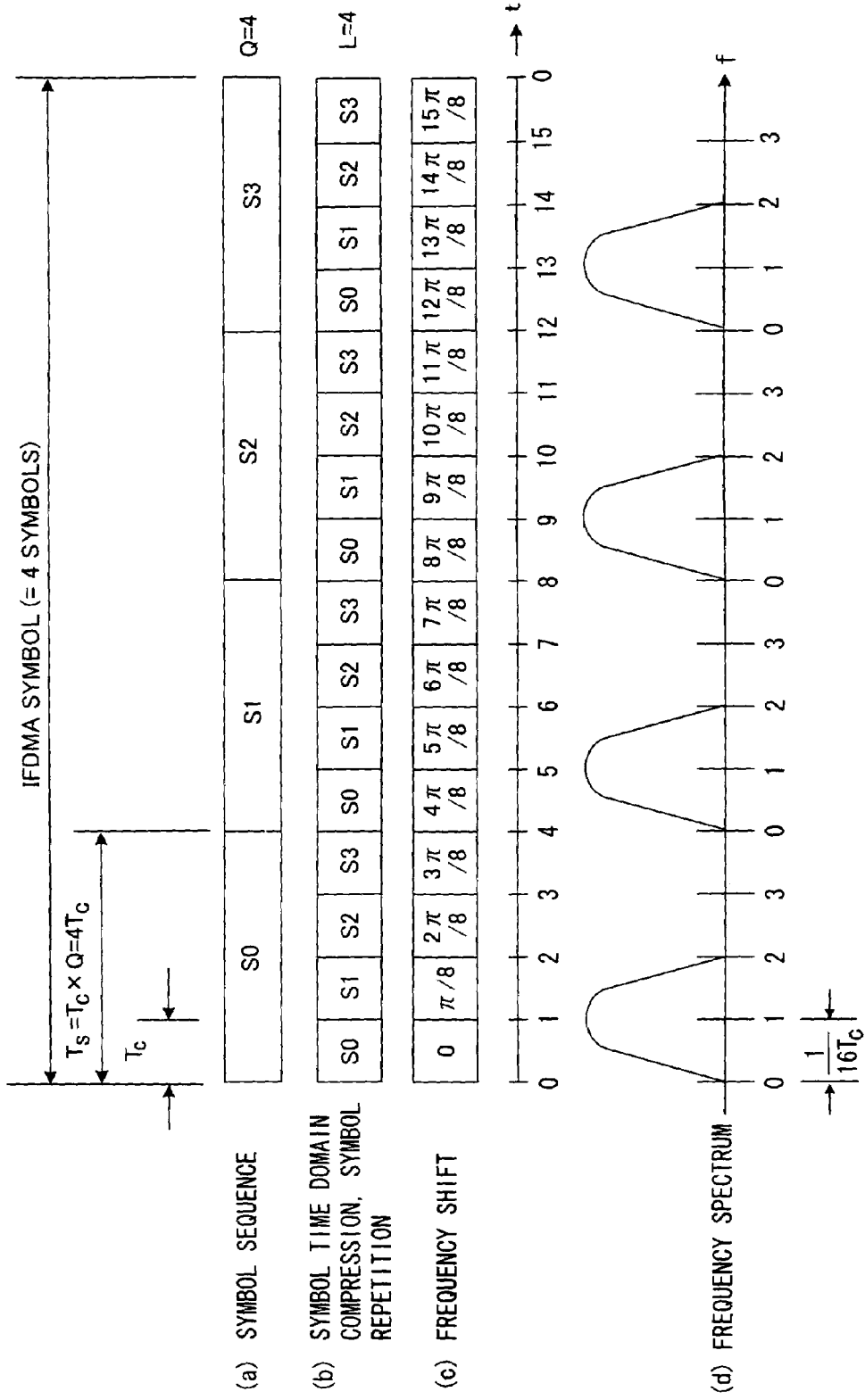
FIG. 24 is a drawing explaining the operation of the mobile station shown in FIG. 21.
Figure 25:
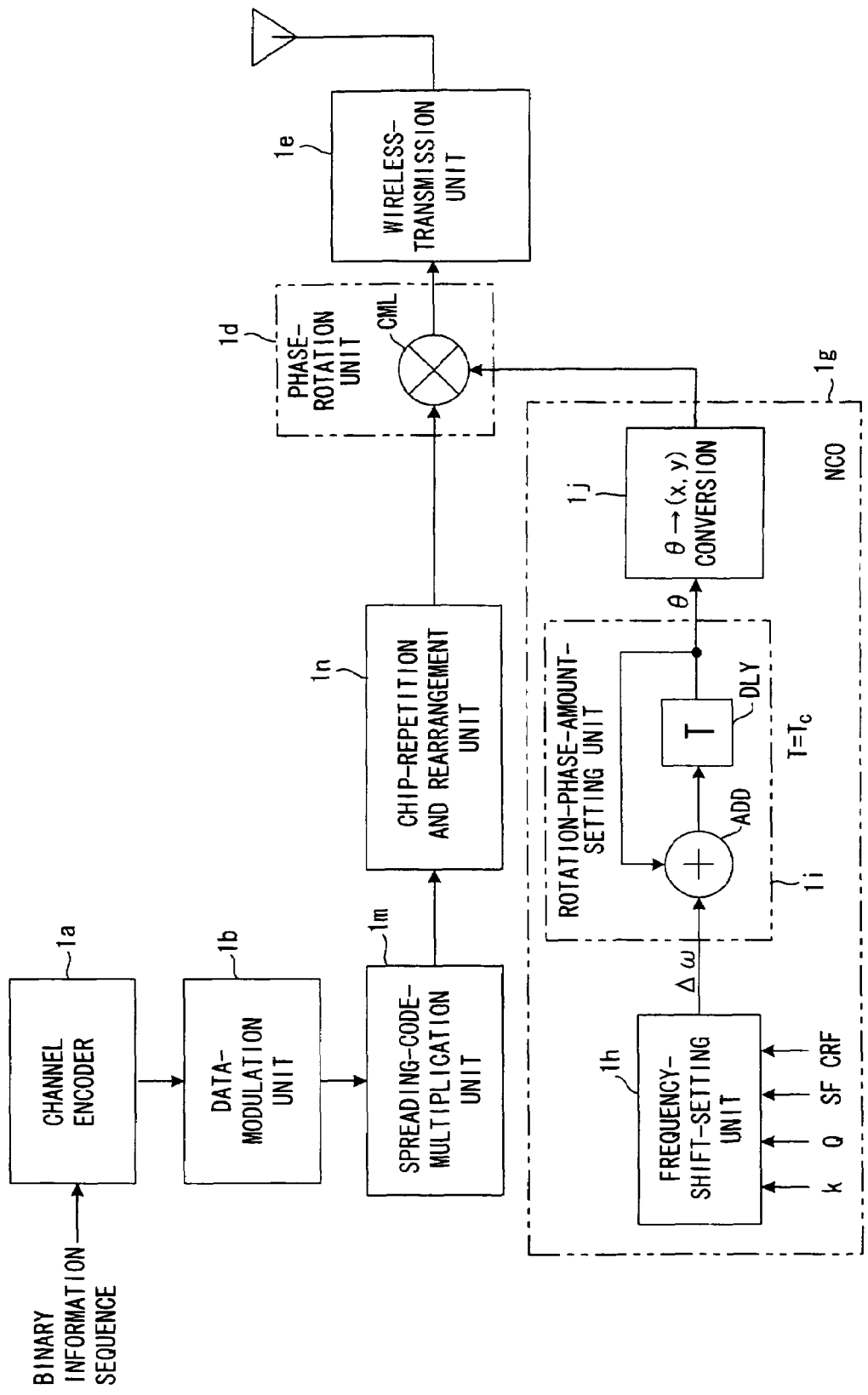
FIG. 25 is a drawing showing another example of construction of a mobile station that employs the IFDMA modulation method.
Figure 26:
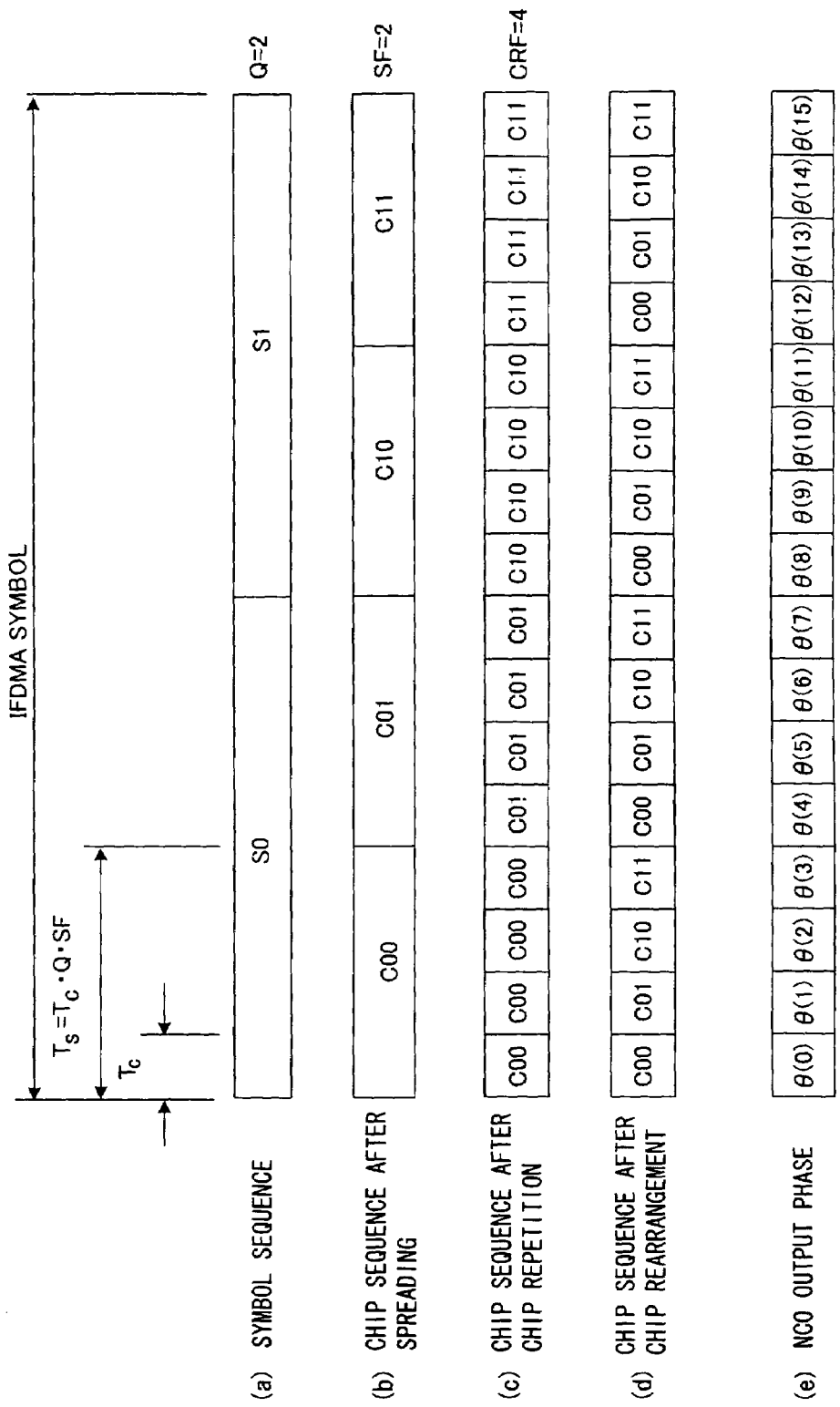
FIG. 26 is a drawing explaining the operation of IFDMA modulation transmission
Figure 27:
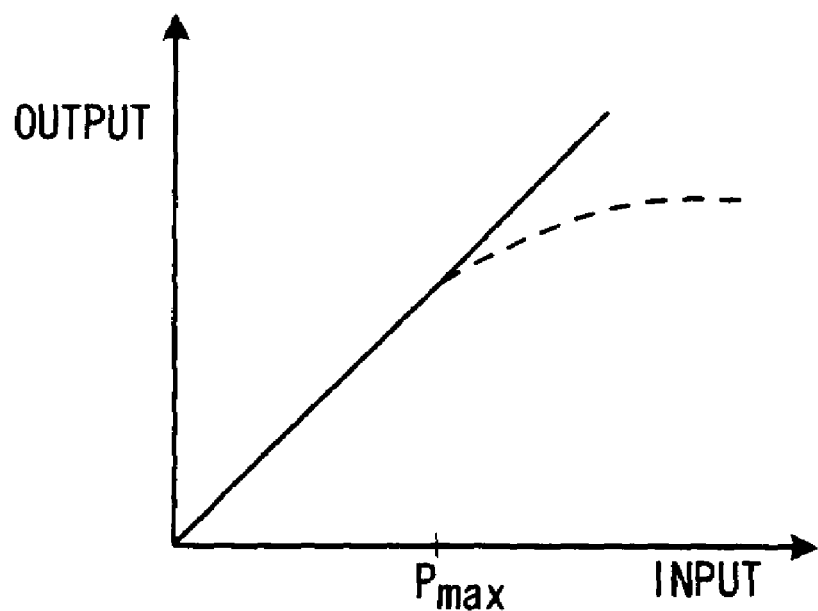
FIG. 27 is a drawing showing the input/output characteristics of a transmission amplifier.

As shown in (a) to (d) of FIG. 8, each symbol of the transmission-symbol sequence is divided into chips, then π/2 phase rotation is performed for the odd-numbered chips of the divided chip sequence, and by compressing the time domains of each chip of the phase-rotated chip sequence, repeating the chips a specified number of times and rearranging each of the chips of the obtained repetitive-chip sequence so that they have the same arrangement as the original chip sequence, a comb-tooth-shaped frequency spectrum (see (h) of FIG. 8) is obtained. By performing phase rotation that changes in increments of k·2π/CRF at each period Ts (=Tc×Q×SF) of the repetitive-chip sequence for each chip of the rearranged repetitive-chip sequence, the spectral position of the comb-tooth-shaped frequency spectrum is dependent on k and shifts in the same way as shown in FIG. 23.

In the NCO 18, the parameter-setting unit 20 sets k and CRF, which were obtained by notification from the base station, in a frequency-shifting unit 21, the frequency-shifting unit 21 then uses the parameters k, CRF to calculate the amount of change in phase rotation per period Ts of the repetitive-chip sequence Δω (=k·2π/CRF), and outputs the result. A rotation-phase-amount-setting unit 22 comprises an adder ADD and a delay unit DLY that applies a delay time T (=Tc×Q×SF), and it performs the calculation

θ=θ+Δω at each period Ts of the repetitive-chip sequence, increases the amount of phase rotation θ in increments of Δω, and outputs the result (see (e) of FIG. 8). A delay-time-setting unit 23 sets the period Ts (=Tc×Q×SF) of the repetitive-chip sequence as the delay time T for the delay unit DLY. A converter 24 calculates the I, Q components (x, y) in the complex plane of the amount of the phase rotation θ, and inputs these components to the phase-rotation unit 16. When k=2, the amount of phase rotation θ changes in increments of π at each period Ts (see (f) of FIG. 8), and the frequency spectrum becomes as shown in (h) of FIG. 8.

The complex multiplier CML of the phase-rotation unit 16 performs calculation according to the equation (X+jY)·(x+jy)

with the chips of the repetitive-chip sequence represented by S (=X+jY), and outputs the calculation results. In actuality, the complex multiplier CML calculates and outputs (Xx−Yy), (Xy+Yx) for every real-number and imaginary part.

In the frequency-division multiplexing transmission apparatus of this second embodiment, with k=2, CRF=4, Q=2 and SF=2, the phase-rotation unit 16 performs phase rotation for each chip of the repetitive-chip sequence as shown in (f) of FIG. 8. As a result, the total amount of phase rotation performed by both the π/2-phase-rotation unit 14 and phase-rotation unit 16 for each chip C0, C1, C2, ... C15 (see (g) of FIG. 8) becomes as shown in FIG. 9. As can be clearly seen from FIG. 9, the phase difference between adjacent chips is ±π/2 every other one, it is possible to suppress a peak, and it is possible increase the amount that PAPR of the transmission signal is reduced in the IFDMA modulation method. As a result, it is possible to use the transmission amplifier more efficiently without the occurrence of distortion.

(b) Frequency-division Receiving Apparatus

Figure 10:
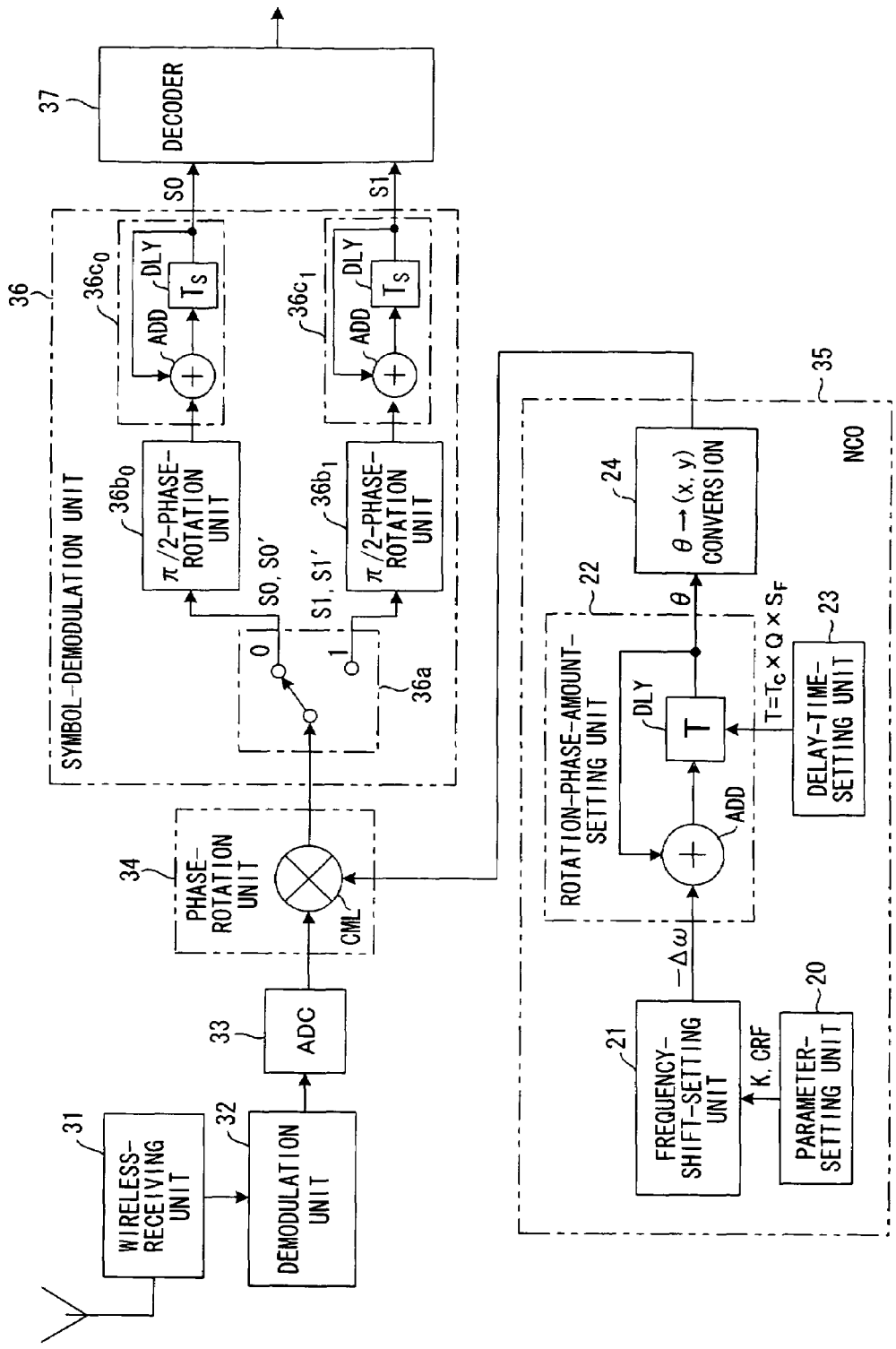
FIG. 10 is a block diagram of the frequency-division multiplexing receiving apparatus.

FIG. 10 is a block diagram of a frequency-division multiplexing receiving apparatus, and this frequency-division multiplexing receiving apparatus can be used as a base station.

A wireless-receiving unit 31 receives a wireless signal, and performs down-conversion of the frequency to a baseband signal, after which a QPSK-demodulation unit 32 performs QPSK demodulation of the baseband signal, and an AD converter 33 converts the demodulated result (symbols) to a digital signal and inputs it to a phase-rotation unit 34. An NCO 35 has construction similar to that of the NCO 18 of the frequency-division multiplexing transmission apparatus, and performs the calculation of the equation $$\theta = \theta - \Delta\omega \quad (8)$$

at each period Ts (=Tc×Q) of the repetitive-chip sequence, and performs phase rotation in the opposite direction of transmission, or in other words, decreases the amount of phase rotation θ in decrements of −Δω.

A complex multiplier CML in the phase-rotation unit 34 performs phase rotation of the chips input from the AD converter 33 according to the amount of phase rotation θ that is calculated using Equation (8) above to restore the signal to its original phase, and inputs the generated repetitive-chip sequence as shown in (d) of FIG. 8 to a symbol-demodulation unit 36. The symbol-demodulation unit 36 integrates the chips S0, S0' of the repetitive-chip sequence to demodulate the transmission symbols S0, and integrates the chips S1, S1' of the repetitive-chip sequence to demodulate the transmission symbols S1. In other words, a switch 36a of the symbol-demodulation unit 36 switches output terminals 0 to 1 at the period 2×Tc, and inputs the chips S0, S0' to a π/2-phase-rotation unit $36b_0$, and inputs the chips S1, S1' to a π/2-phase-rotation unit $36b_1$. The π/2-phase-rotation unit $36b_0$ performs −π/2 phase rotation for the odd-numbered chips S0' to obtain S0, and an integrator $36c_0$ integrates chips S0 to demodulate the transmission symbols S0, and similarly, the π/2-phase-rotation unit $36b_1$ performs −π/2 phase rotation for the odd-numbered chips S1' to obtain S1, and an integrator $36c_1$ integrates chips S1 to demodulate the transmission symbols S1. A decoder 37 performs an error-correction-decoding process for each of the input symbols S0, S1, and inputs the result to a data-processing unit (not shown in the figure). When the π/2-phase-rotation unit 14 of the transmission apparatus performs −π/2 phase rotation of the chips, the π/2-phase-rotation units $36b_0$, $36b_1$ perform π/2 phase rotation.

With the frequency-division multiplexing receiving apparatus described above, it is possible to accurately demodulate the transmission symbols that were transmitted from the frequency-division multiplexing transmission apparatus of the second embodiment.

(C) Third Embodiment

Figure 11:
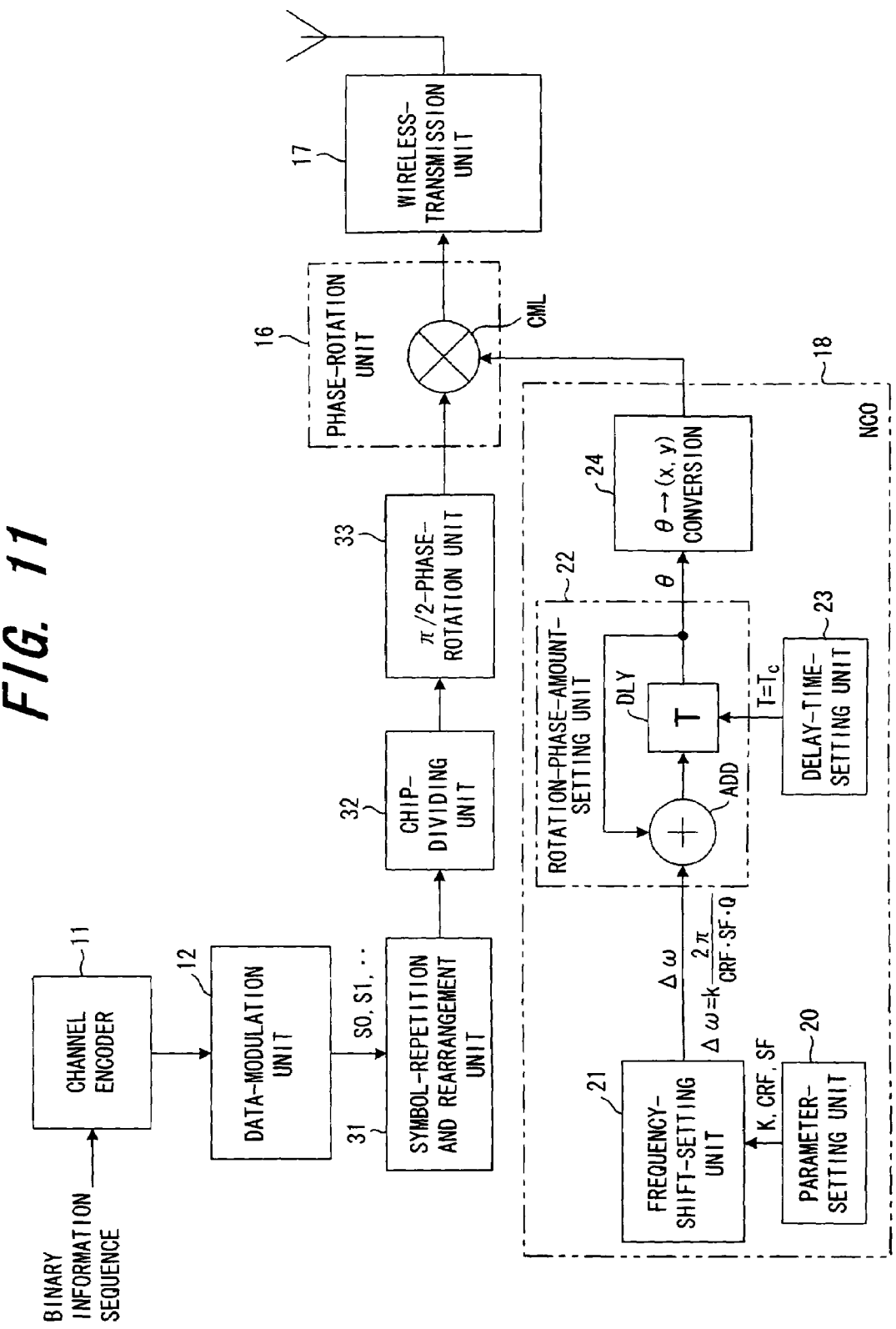
FIG. 11 is a block diagram of the frequency-division multiplexing transmission apparatus according to a third embodiment of the present invention.
Figure 12:
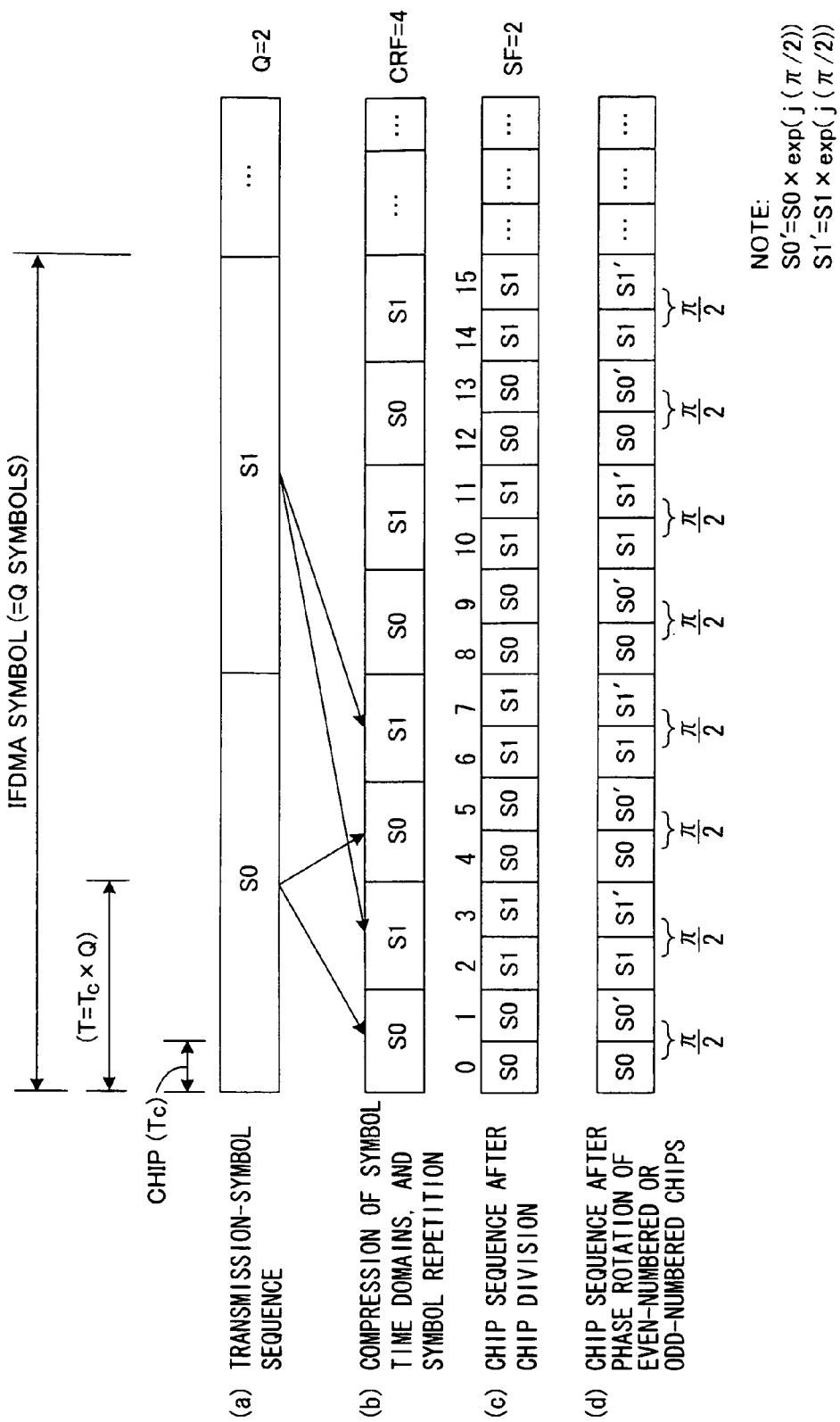
FIG. 12 is a drawing explaining the operation of the frequency-division multiplexing transmission apparatus.

FIG. 11 is a block diagram of the frequency-division multiplexing transmission apparatus of a third embodiment of the present invention, and FIG. 12 is a drawing explaining the operation of the frequency-division multiplexing transmission apparatus, where in FIG. 11, the same reference numbers are given to parts that are the same as those of the first embodiment shown in FIG. 2.

This third embodiment differs from the first embodiment in that it compresses the time domains of each of the symbols of the transmission sequence, then repeats the symbols a specified number of times (CRF times) and rearranges the symbols of the obtained repetitive-symbol sequence so that the arrangement is the same as the arrangement of the transmission-symbol sequence, after which it performs chip division and π/2 phase rotation; the operation of the other parts is the same.

A channel-encoder 11 performs channel encoding by applying error-correction encoding such as turbo encoding, or convolutional encoding to the input binary information sequence, and a data-modulation unit 12 converts the channel-encoded data sequence to I, Q complex components (symbols) in QPSK, for example. As shown in (a) of FIG. 12, one IFDMA symbol is composed of Q-number of symbols S0, S1 (Q=2 in the figure).

A symbol-repetition and rearrangement unit 31 compresses the time domains of each of the symbols of the transmission-symbol sequence, then repeats those symbols CRF times (CRF=4 in the figure), and rearranges each of the symbols of the obtained repetitive-symbol sequence so that the arrangement is the same as the arrangement of the transmission-symbol sequence (see (b) of FIG. 12). Next, a chip-dividing unit 32 divides each of the symbols of the rearranged repetitive-symbol sequence into SF number (SF=2 in the figure) of chips (see (c) of FIG. 12), and a π/2-phase-rotation unit 33 performs π/2 or −π/2 phase rotation for the even-numbered or odd-numbered chip in the divided chip sequence (see (d) of FIG. 12). In the figure, π/2 phase rotation is performed for the odd-numbered chips. The mark ' is given to chips for which phase rotation has been performed.

The same control as was performed in the second embodiment is performed. In other words, the complex multiplier CML of a phase-rotation unit 16 performs phase rotation specific to the mobile station for each chip of the repetitive-chip sequence, and a wireless-transmission unit 17 performs up-conversion of the frequency that is input from the phase-rotation unit 16 from a baseband frequency to a radio frequency, then amplifies the signal and transmits it from an antenna.

A numerically controlled oscillator (NCO) 18 calculates the amount of phase rotation θ per unit time Tc, and the complex multiplier CML of the phase-rotation unit 16 performs phase rotation specific to the mobile station for each chip of the repetitive-chip sequence and executes processing to shift the frequency. The phase $\theta_k(t)$ that is output from the NCO 18 is given by Equation (4).

The NCO 18 has a frequency-shift-setting unit 21 that uses the parameters k, CRF, SF and Q in the portion for setting the amount of change in phase rotation per unit time Tc (angular speed) Δω to calculate the angular speed Δω from Equation (5), and outputs the result. A rotation-phase-amount-setting unit 22 comprises a delay unit DLY, which applies a delay time T (=Tc) that is set by a delay-time-setting unit 23, and an adder ADD, and by performing the operation of Equation (6) for each unit time T, increases the amount of phase rotation θ in increments of Δω and outputs the result. A converter 24 calculates the I, Q components (x, y) in the complex plane of the phase rotation amount θ, and inputs these components to the phase-rotation unit 16. With S (=X+jY) as the chips of the repetitive-chip sequence, the phase-rotation unit 16 performs the calculation $$(X+jY)\cdot(x+jy)$$

and outputs the calculation results.

As shown in (d) of FIG. 12, in this third embodiment, it is possible to make the phase difference between adjacent chips ±π/2 every other one, and by doing so it is possible to prevent the phase difference between chips from becoming π, effectively suppress a peak in the transmission signal in the IFDMA modulation method, and reduce the PAPR.

(D) Fourth Embodiment

In the third embodiment, the PAPR was reduced by rotating the phase of the even-numbered or odd-numbered chips of the chip sequence by π/2 or −π/2. However, in the third embodiment, the phase-rotation unit 16 also performed frequency shifting specific to the mobile station. Therefore, depending on the frequency specific to the mobile station, there are cases in which it is not possible to reduce the PAPR. In other words, it is not possible to make the phase difference between adjacent chips ±π/2 every other one, and there are cases in which the phase difference between adjacent chips changes as π→0→π, a peak (overshoot) occurs in the transmission signal, and it is not possible to reduce the PAPR.

Therefore, as in the case of the second embodiment, in this fourth embodiment, the phase-rotation unit 16 changes the amount of phase rotation performed for each chip of the repetitive-chip sequence in increments of $k \cdot 2\pi/CRF$ at each period Ts (=Tc×Q×SF) of the repetitive chip sequence. Here, k is an integer specific to the mobile station. By doing this, the frequency spectrum changes according to k, and the phase difference between adjacent chips of the repetitive-chip sequence C0, C1, C2, ..., C15 is made to be ±π/2 every other one.

(a) Frequency-division Multiplexing Transmission Apparatus

Figure 13:
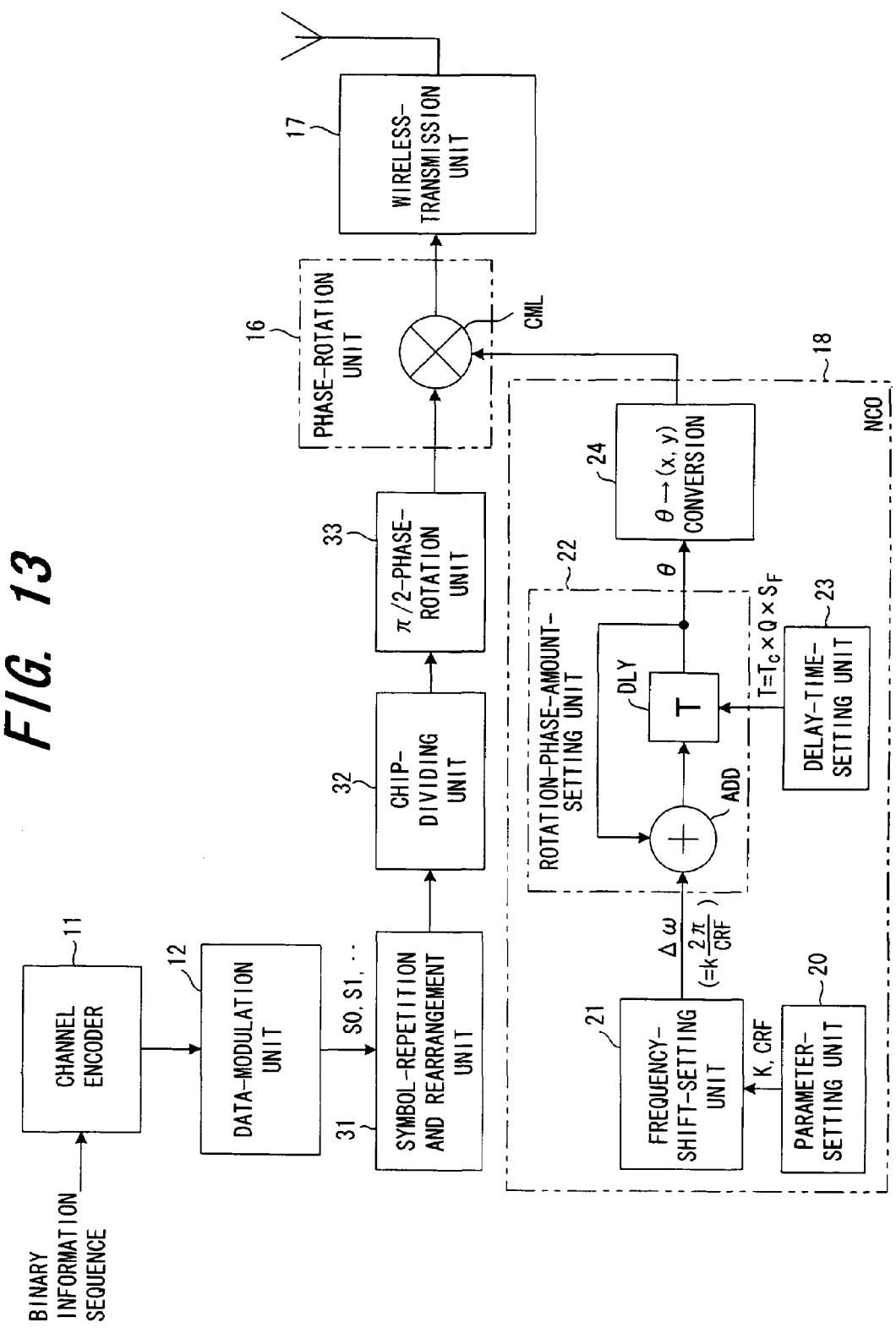
FIG. 13 is a block diagram of the-frequency-division multiplexing transmission apparatus according to a fourth embodiment of the present invention.
Figure 14:
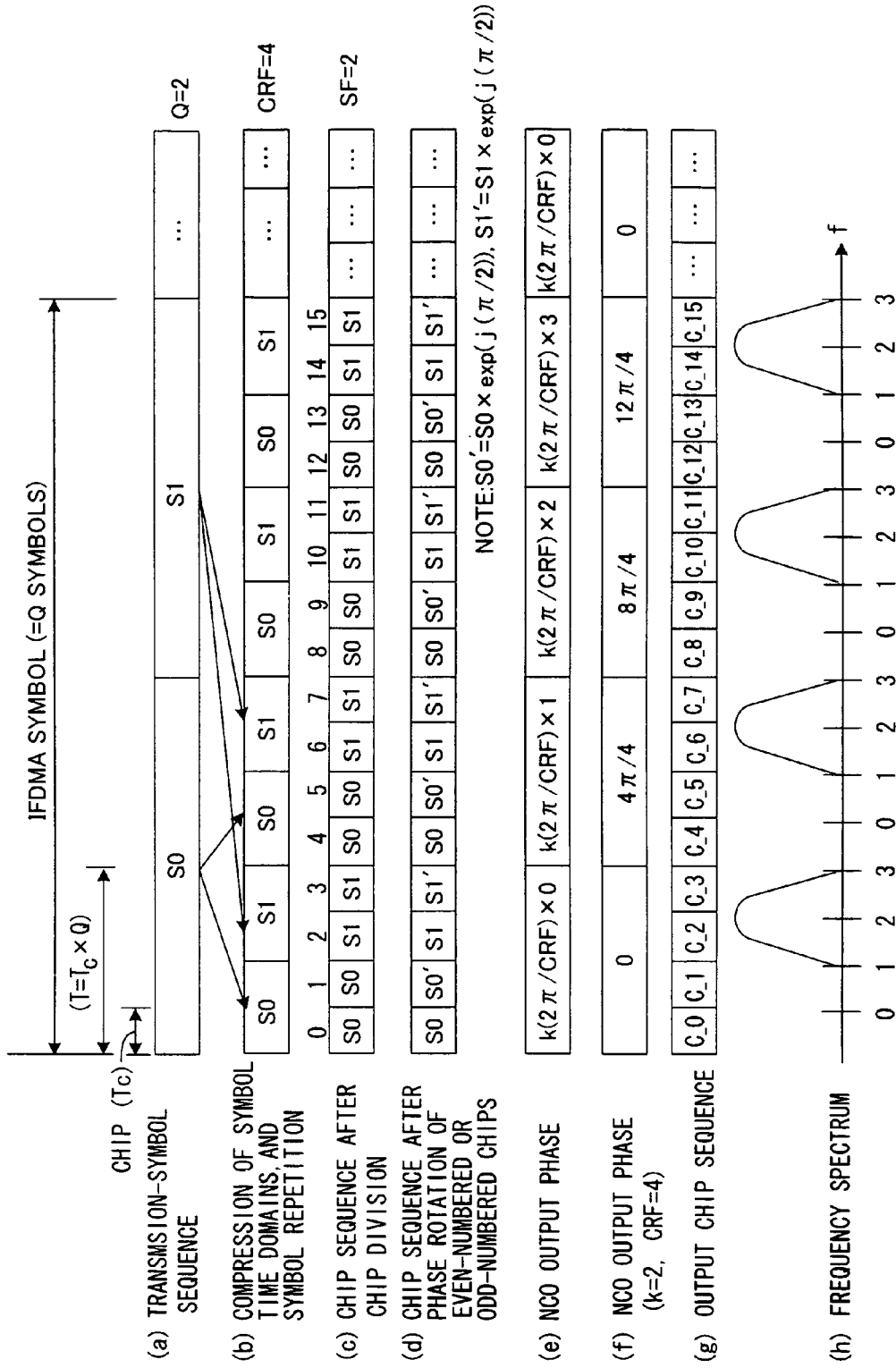
FIG. 14 is a drawing explaining the operation of the frequency-division multiplexing transmission apparatus.

FIG. 13 is a block diagram of the frequency-division multiplexing transmission apparatus of a fourth embodiment of the present invention, and FIG. 14 is a drawing explaining the operation of the frequency-division multiplexing transmission apparatus, where Q=2, SF=2 and CRF=4. In FIG. 13, the same reference numbers are applied to parts that are the same as in the second embodiment shown in FIG. 7. This fourth embodiment differs from the second embodiment in that it compresses the time domains of each of the symbols of the transmission-symbol sequence, then repeats the symbols a specified number of times (CRF times) and rearranges the symbols of the obtained repetitive-symbol sequence so that the arrangement is the same as the arrangement of the transmission-symbol sequence, after which it performs chip division and π/2 phase rotation; the operation of the other parts is the same.

A channel-encoder 11 performs channel encoding by applying error-correction encoding such as turbo encoding, or convolutional encoding to the input binary information sequence, and a data-modulation unit 12 converts the channel-encoded data sequence to I, Q complex components (symbols) in QPSK, for example. As shown in (a) of FIG. 14, one IFDMA symbol is composed of Q-number of symbols S0, S1 (Q=2 in the figure).

A symbol-repetition and rearrangement unit 31 compresses the time domains of each of the symbols of the transmission-symbol sequence, then repeats those symbols CRF times (CRF=4 in the figure), and rearranges each of the symbols of the obtained repetitive-symbol sequence so that the arrangement is the same as the arrangement of the transmission-symbol sequence (see (b) of FIG. 14). Next, a chip-dividing unit 32 divides each of the symbols of the rearranged repetitive-symbol sequence into SF number (SF=2 in the figure) of chips (see (c) of FIG. 14), and a π/2-phase-rotation unit 33 performs π/2 or −π/2 phase rotation for the even-numbered or odd-numbered chip in the divided chip sequence (see (d) of FIG. 14). In the figure, π/2 phase rotation is performed for the odd-numbered chips. The mark ' is given to chips for which phase rotation has been performed.

The same control as was performed in the second embodiment is performed. In other words, the complex multiplier CML of a phase-rotation unit 16 performs phase rotation specific to the mobile station for each chip of the repetitive-chip sequence. More specifically, the phase-rotation unit 16 changes the amount of phase rotation performed for each chip in increments of $k \cdot 2\pi/CRF$ at each period Ts (=Tc×Q×SF) of the repetitive-chip sequence as shown in (e) of FIG. 14. Here, k is an integer that is specific to the mobile station, and is any one value among 0, 1, 2, ..., CRF−1. A wireless-transmission unit 17 performs up-conversion of the frequency of the signal that is input from the phase-rotation unit 16 from a baseband frequency to a radio frequency, after which it amplifies the signal and transmits it from an antenna.

As shown in (a) to (d) of FIG. 14, by compressing the time domains of each symbol of the transmission-symbol sequence, repeating the symbols a specified number of times, rearranging each of the symbols of the obtained repetitive-symbol sequence so that they have the same arrangement as the transmission-symbol, then dividing the rearranged repetitive symbols into chip, a comb-tooth-shaped frequency spectrum (see (h) of FIG. 14) occurs. By performing phase rotation that changes in increments of $k \cdot 2\pi/CRF$ at each period Ts (=Q×SF×Tc) of the repetitive-chip sequence for each chip of the rearranged repetitive-chip sequence, the spectral position of the comb-tooth-shaped frequency spectrum is dependent on k and shifts in the same way as shown in FIG. 23.

In a NCO 18, a parameter-setting unit 20 sets k and CRF, which were obtained by notification from the base station, in a frequency-shifting unit 21, the frequency-shifting unit 21 then uses the parameters k, CRF to calculate the amount of change in phase rotation per period Ts of the repetitive-chip sequence $\Delta\omega(=k \cdot 2\pi/CRF)$, and outputs the result. A rotation-phase-amount-setting unit 22 comprises an adder ADD and a delay unit DLY that applies a delay time T (=Tc×Q×SF), and it performs the calculation $$\theta = \theta + \Delta\omega$$

at each period Ts of the repetitive-chip sequence, increases the amount of phase rotation θ in increments of Δω, and outputs the result (see (e) of FIG. 14). A delay-time-setting unit 23 sets the period Ts (=Tc×Q×SF) of the repetitive-chip sequence as the delay time T for the delay unit DLY. A converter 24 calculates the I, Q components (x, y) in the complex plane of the amount of the phase rotation θ, and inputs these components to the phase-rotation unit 16. When k=2, the amount of phase rotation θ changes in increments of π at each period Ts (see (f) of FIG. 14), and the frequency spectrum becomes as shown in (h) of FIG. 14.

The complex multiplier CML of the phase-rotation unit 16 performs calculation according to the equation $$(X+jy) \cdot (x+jy)$$

with the chips of the repetitive-chip sequence represented by S (=X+jY), and outputs the calculation results.

In the frequency-division multiplexing transmission apparatus of this fourth embodiment, with k=2, CRF=4, Q=2 and SF=2, the phase-rotation unit 16 performs phase rotation for each chip of the repetitive-chip sequence as shown in (f) of FIG. 14. As a result, the total amount of phase rotation performed by both the π/2-phase-rotation unit 33 and phase-rotation unit 16 for each chip C0, C1, C2, . . . C15 (see (g) of FIG. 14) becomes as shown in FIG. 15. As can be clearly seen from FIG. 15, the phase difference between adjacent chips is $\pm\pi/2$ every other one, it is possible to suppress a peak, and it is possible increase the amount that PAPR of the transmission signal is reduced in the IFDMA modulation method. As a result, it is possible to use the transmission amplifier more efficiently without the occurrence of distortion.

(b) Frequency-division Receiving Apparatus

Figure 16:
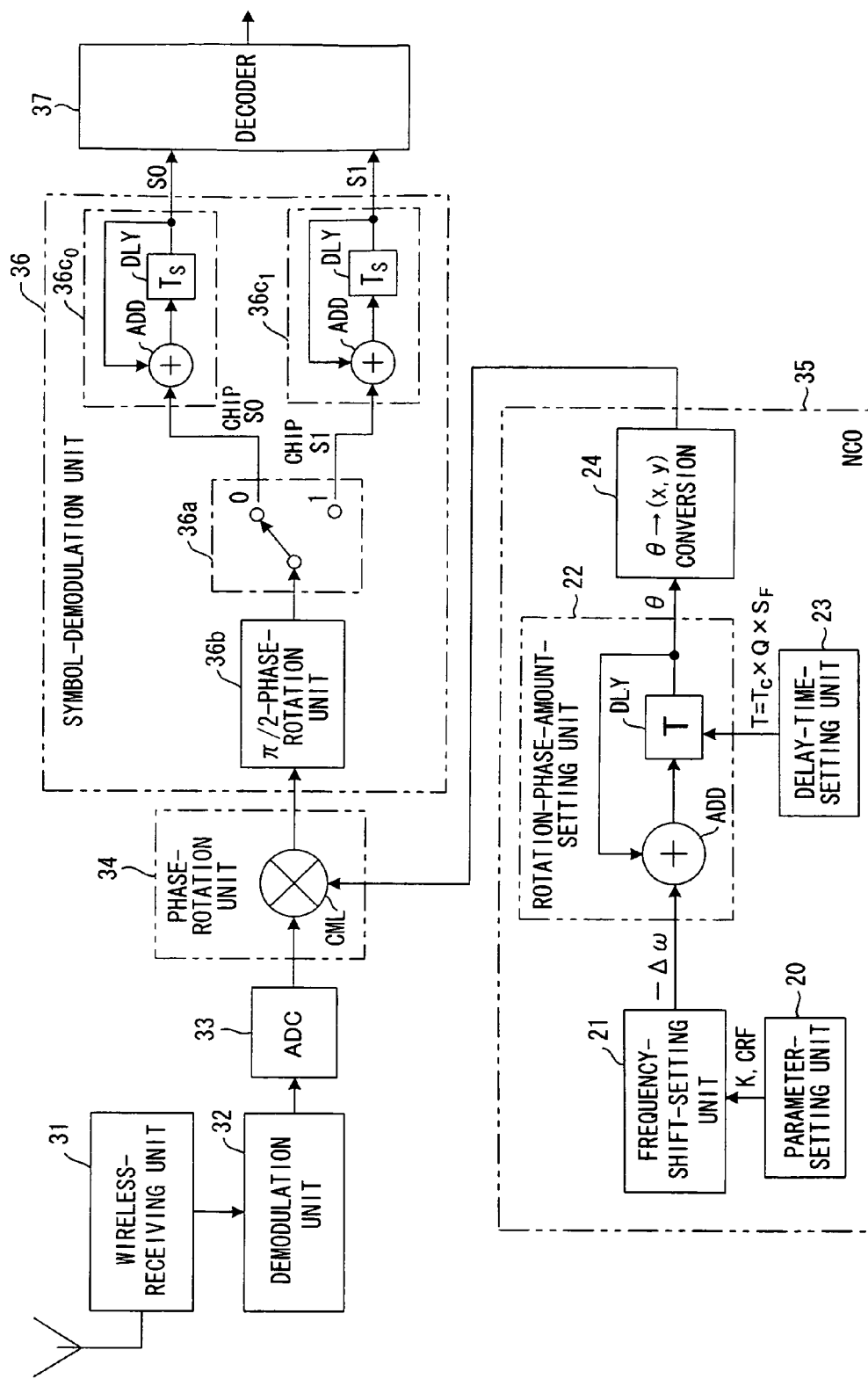
FIG. 16 is a block diagram of the frequency-division multiplexing receiving apparatus.

FIG. 16 is a block diagram of a frequency-division multiplexing receiving apparatus, where the same reference numbers are given to parts that are the same as those of the frequency-division multiplexing receiving apparatus of the second embodiment shown in FIG. 10. This embodiment differs in that there is one $\pi/2$-phase-rotation unit, and it is located before the switch 36a.

A wireless-receiving unit 31 receives a wireless signal, and performs down-conversion of the frequency to a baseband signal, after which a QPSK-demodulation unit 32 performs QPSK demodulation of the baseband signal, and an AD converter 33 converts the demodulated result (chips) to a digital signal and inputs it to a phase-rotation unit 34. An NCO 35 has construction similar to that of the NCO 18 of the frequency-division multiplexing transmission apparatus, and performs the calculation of the equation $$\theta = \theta - \Delta\omega$$

at each period Ts ($=Tc \times Q \times SF$) of the repetitive-chip sequence, and performs phase rotation in the opposite direction of transmission, or in other words, decreases the amount of phase rotation $\theta$ in decrements of $-\Delta\omega$.

The complex multiplier CML in a phase-rotation unit 34 performs phase rotation of the chips input from the AD converter 33 according to the amount of phase rotation $\theta$ that is calculated using the Equation above to restore the signal to its original phase, and inputs the generated repetitive-chip sequence as shown in (d) of FIG. 14 to a symbol-demodulation unit 36. In the symbol-demodulation unit 36, a $\pi/2$-phase-rotation unit 36b performs $-\pi/2$ phase rotation for the odd-numbered chips S0', S1' to obtain S0, S1, and outputs the chip sequence shown in (c) of FIG. 14. A switch 36a switches output terminals 0 to 1 at the period $2 \times Tc$, and inputs the chips S0 to an integrator 36c$_0$, and inputs the chips S1 to an integrator 36c$_1$. The integrator 36c$_0$ integrates chips S0 to demodulate the transmission symbols S0, and the integrator 36c$_1$ integrates chips S1 to demodulate the transmission symbols S1. A decoder 37 performs an error-correction-decoding process for each of the input symbols S0, S1, and inputs the result to a data-processing unit (not shown in the figure). When the $\pi/2$-phase-rotation unit 33 of the transmission apparatus performs $-\pi/2$ phase rotation of the chips, the $\pi/2$-phase-rotation unit 36b performs $\pi/2$ phase rotation.

In FIG. 16, construction was shown for only one mobile station, however, there is a phase-rotation unit 34, NCO 35 and symbol-demodulation unit 36 for each mobile station.

With the frequency-division multiplexing receiving apparatus described above, it is possible to accurately demodulate the transmission symbols that are transmitted from the frequency-division multiplexing transmission apparatus of the fourth embodiment.

(E) Fifth Embodiment (a) Frequency-division Multiplexing Transmission Apparatus

Figure 17:
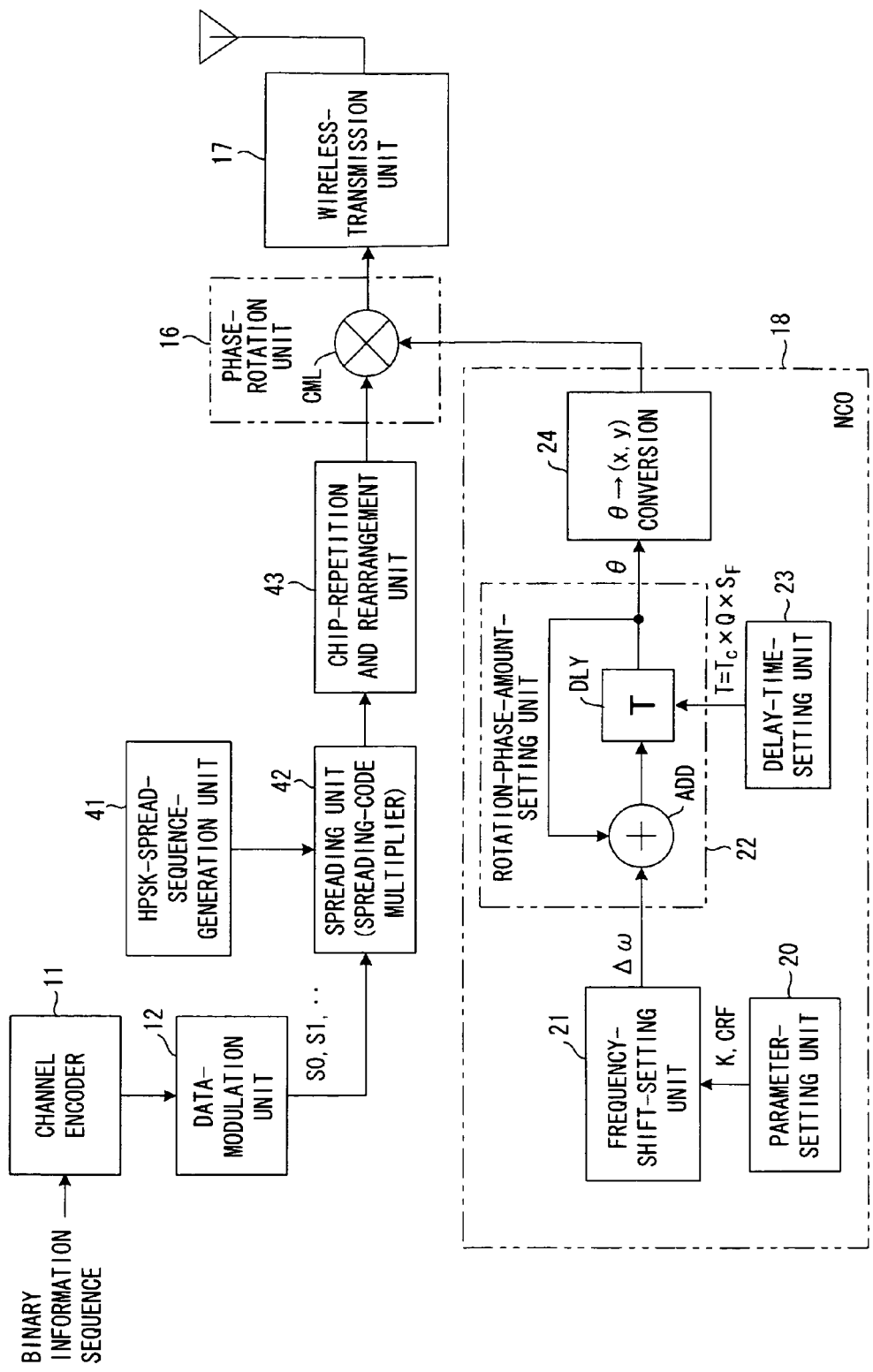
FIG. 17 is a block diagram of the frequency-division multiplexing transmission apparatus according to a fifth embodiment of the present invention.
Figure 18:
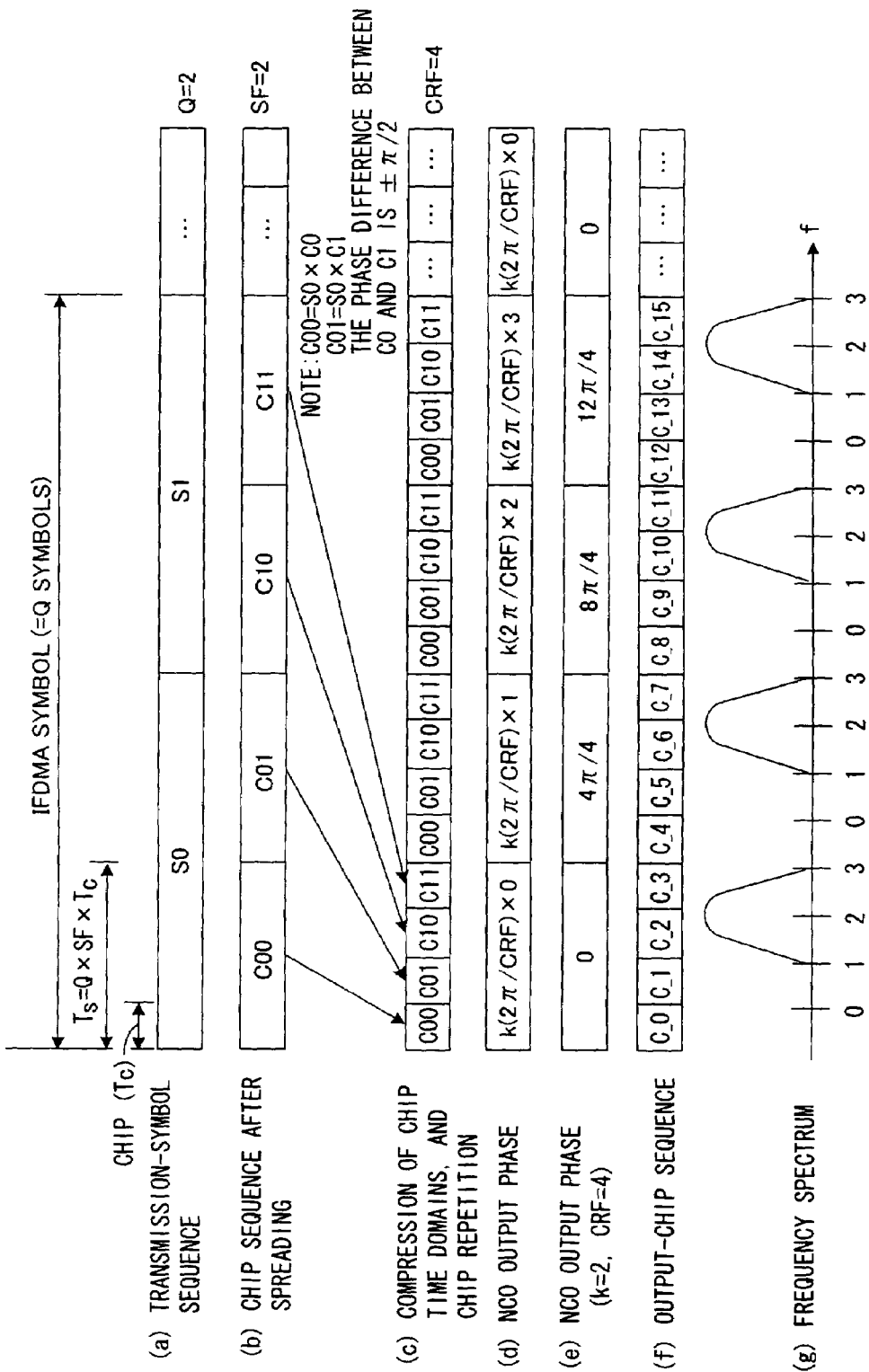
FIG. 18 is a drawing explaining the operation of the frequency-division multiplexing transmission apparatus.
Figure 21:
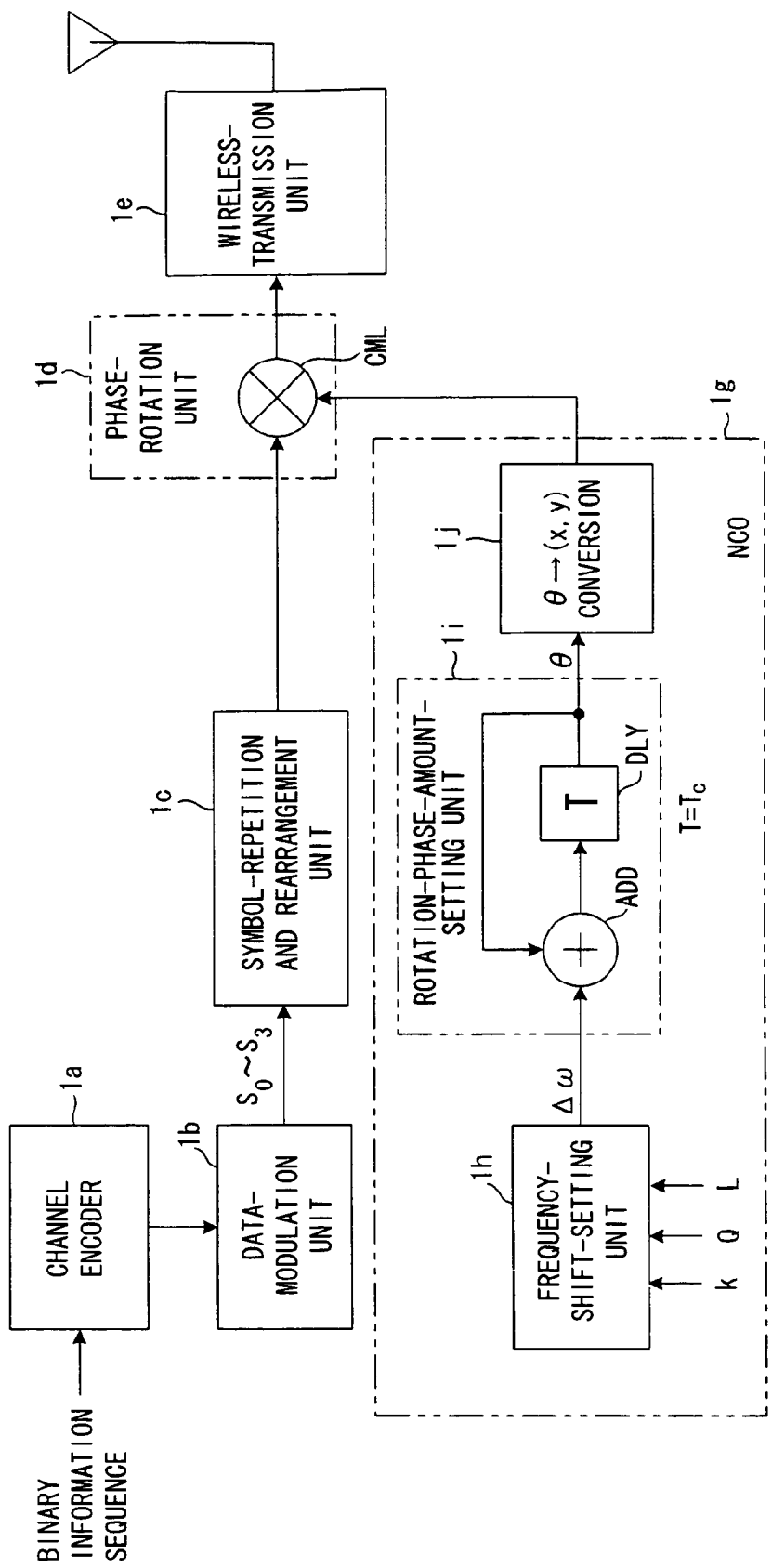
FIG. 21 is a drawing showing the construction of a mobile station that employs the IFDMA modulation method.
Figure 22:
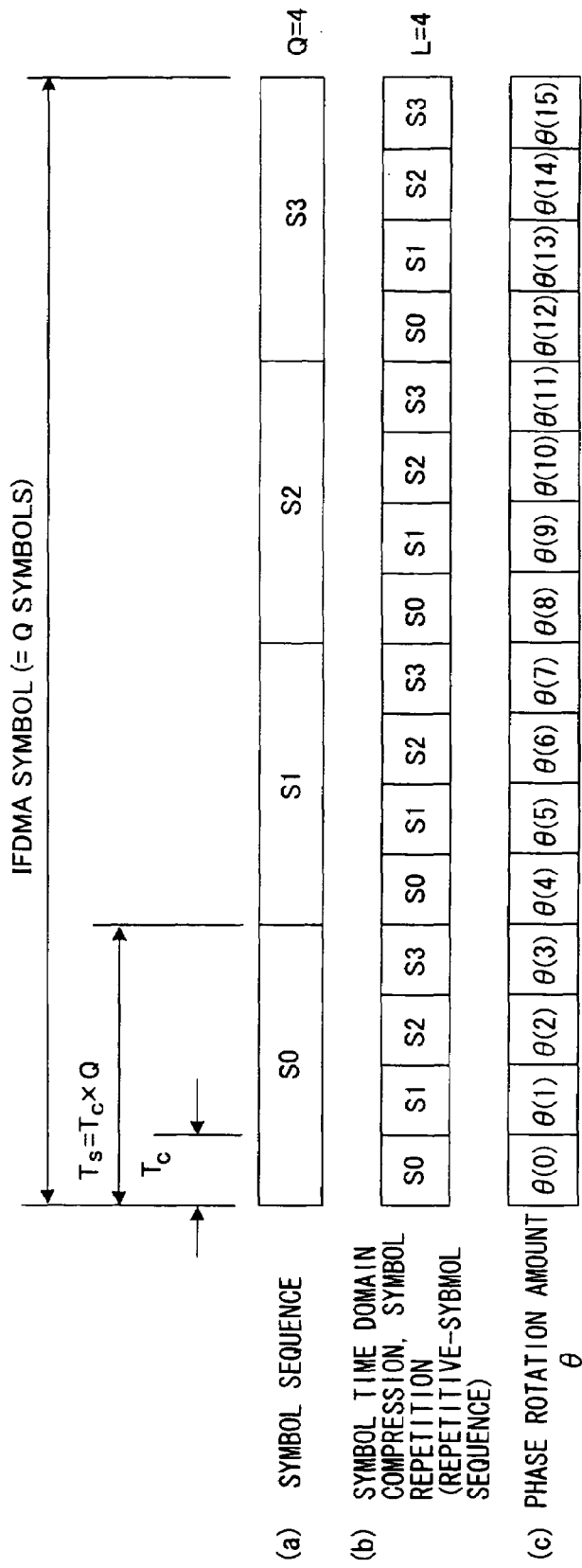
FIG. 22 is a drawing explaining an IFDMA symbol.

FIG. 17 is a block diagram of the frequency-division multiplexing transmission apparatus of a fifth embodiment of the present invention, and FIG. 18 is a drawing explaining the operation of the frequency-division multiplexing transmission apparatus, where the frequency-division multiplexing transmission apparatus can be used as a mobile station. The embodiment shown in FIG. 17 differs from the frequency-division multiplexing transmission apparatus of the second embodiment shown in FIG. 7 in that:

(1) there is a HPSK (Hybrid Phase Shift Keying)-spread sequence generation unit 41 that generates a repetitive-spread sequence, such as a HPSK-spread sequence, in which the phase difference between adjacent spreading code alternates between $\pm\pi/2$ and $m \cdot \pi/2$ (where m is an integer such as 0, ±1, 2);

(2) there is a spreading-code-multiplier (spreading unit) 42 located after the data-demodulation unit 12 that multiplies the input symbols S0, S1 (see (a) of FIG. 18) by the HPSK-spread sequence C0, C1, C2, C3 to generate a spread-chip sequence C00, C01, C10, C11 (see (b) of FIG. 18); and (3) a chip-repetition and rearrangement unit 43 compresses the time domains of each chip of the chip sequence C00, C01, C10, C11 that is output from the spreading unit 42, then repeats the chips a specified number of times (=CRF) (see (c) of FIG. 18), rearranges the chips of the repetitive-chip sequence so that they have the same arrangement as the original chip sequence, and outputs the result (see (c) of FIG. 18).

A channel-encoder 11 performs channel encoding by applying error-correction encoding such as turbo encoding, or convolutional encoding to the input binary information sequence, and a data-modulation unit 12 converts the channel-encoded data sequence to I, Q complex components (symbols) in QPSK, for example. As shown in (a) of FIG. 18, one IFDMA symbol is composed of Q-number of symbols S0, S1 (Q=2 in the figure). The spreading-code-multiplier 42 multiplies the symbols S0, S1 by the HPSK-spreading code c0, c1, c2, c3 and spreads the symbols by a spreading factor SF (SF=2 in the figure) to generate a spread-chip sequence (see (b) of FIG. 18). As a result, one IFDMA frame is composed of 4 ($=Q \times SF$) chips C00, C01, C10, C11. Here, $$C00 = S0 \times c0$$

$$C01 = S0 \times c1$$

$$C10 = S1 \times c2$$

$$C11 = S1 \times c3$$

where the phase difference between c0 and c1 is $\pm\pi/2$, and the phase difference between c2 and c3 is $\pm\pi/2$.

The chip-repetition and rearrangement unit 43 compresses the time domains of the 4 chips C00, C01, C10, C11 of the spread chip sequence, and together with repeating each chip CRF times (CRF=4 in the figure), rearranges the repetitive-chip sequence so that it has the same arrangement as the original chip sequence C00, C01, C10, C11 (see (c) of FIG. 18). A phase-rotation unit 16 rotates the phase of each chip of the repetitive-chip sequence by changing the amount of phase rotation in increments of $k \cdot 2\pi/CRF$ at each period Ts of the repetitive-chip sequence as shown in (d) of FIG. 18, Here k is an integer specific to the mobile station and is any one among $0, 1, 2, \ldots, CRF-1$. A wireless-transmission unit 17 performs up-conversion of the frequency of the signal input from the phase-rotation unit 16 from a baseband frequency to a radio frequency, then amplifies and transmits the signal from an antenna.

As shown in (b) to (d) of FIG. 18, by compressing the time domains of each of the chips of the chip sequence C00, C01, C10, C11, then repeating each chip a specified number of times (CRF=4) and rearranging the repeated chips so that they have the same arrangement as the original chip sequence, the rearranged repetitive-chip sequence will have a comb-tooth-shaped frequency spectrum as shown in (g) of FIG. 18. Also, when phase rotation that changes at a speed that is specific to the mobile station is performed for each chip of the rearranged repetitive-chip sequence, and the amount of phase rotation changes in increments of k·2π/CRF at each period Ts of the repetitive-chip sequence, for example, the frequency spectrum shifts and frequency-division multiplexing transmission becomes possible. The amount of phase rotation and the frequency spectrum for the case in which k=2, Q=2, SF=2 and CRF=4 are shown in (e) and (g) of FIG. 18, respectively.

A numerical control led oscillator (NCO) 18 calculates the amount of phase rotation θ so that it changes in increments of k·2π/CRF at each period Ts of the repetitive-chip sequence, and the complex multiplier CML of the phase-rotation unit 16 performs that amount of phase rotation for each chip of the repetitive-chip sequence, and performs frequency-shift processing. The phase θ(t) that is output from the NCO 18 is given by the equation below.

$$\theta(t) = k \cdot 2\pi \frac{1}{CRF \cdot Ts} \cdot t \quad (9)$$

Here, k is a value that corresponds to the mobile station, and is any one value among 0, 1, 2, ..., CRF−1. The phase θ that is output from the NCO 18 increases in increments of k·2π/CRF at each period Ts (=Tc×Q×SF) of the repetitive-chip sequence, and the IFDMA period is one cycle.

In the frequency-division multiplexing transmission apparatus of this fifth embodiment, with k=2, Q=2, SF=2 and CRF=4, the phase-rotation unit 16 performs phase rotation for each chip of the repetitive-chip sequence as shown in (e) of FIG. 18. As a result, the total amount of phase rotation performed for each chip of the repetitive-chip sequence C0, C1, C2, ... C15 (see (f) of FIG. 18) becomes as shown in FIG. 19. As can be clearly seen from FIG. 19, the phase difference between adjacent chips is ±π/2 every other one, and it is possible increase the amount that PAPR of the transmission signal is reduced in the IFDMA modulation method. As a result, it is possible to use the transmission amplifier more efficiently without the occurrence of distortion.

(b) Frequency-division Multiplexing Receiving Apparatus

FIG. 20 is a block diagram of a frequency-division multiplexing receiving apparatus, and this frequency-division multiplexing receiving apparatus can be used as a base station. In FIG. 20, the same reference numbers are used for parts that are the same as those of the frequency-division multiplexing receiving apparatus of the second embodiment shown in FIG. 10. This frequency-division multiplexing receiving apparatus differs in that:

(1) there is a HPSK (Hybrid Phase Shift Keying)-spread sequence generation unit 51 that generates a HPSK-spread sequence, in which the phase difference between adjacent spreading code alternates between ±π/2 and m·π/2 (where m is an integer such as 0, ±1, 2);

(2) there is a code-repetition unit 52 that repeats each code of the HPSK-spread sequence that is generated from the HPSK-spread sequence generation unit 51 CRF number of times, and outputs the repeated HPSK-spread sequence; and (3) there is a reverse-spreading unit 53 that multiplies the repetitive-chip sequence, which is disposed in a later stage of the phase-rotation unit 34, by the HPSK-spread sequence and performs reverse spreading.

A wireless-receiving unit 31 receives a wireless signal, and performs down-conversion of the frequency to a baseband signal, after which a QPSK-demodulation unit 32 performs QPSK demodulation of the baseband signal, and an AD converter 33 converts the demodulated result (repetitive-chip sequence) to a digital signal and inputs it to a phase-rotation unit 34. An NCO 35 has construction similar to that of the NCO 18 of the frequency-division multiplexing transmission apparatus, and performs the calculation of the equation $$\theta = \theta - \Delta\omega$$

at each period Ts of the repetitive-chip sequence, and performs phase rotation in the opposite direction of transmission, or in other words, decreases the amount of phase rotation θ in decrements of −Δω. The complex multiplier CML in the phase-rotation unit 34 performs phase rotation of the QPSK-demodulation signal (chip sequence) input from the AD converter 33 according to the amount of phase rotation θ that is calculated using Equation above, and inputs the chip sequence as shown in (c) of FIG. 18 to the reverse-spreading unit 53.

The reverse-spreading unit 53 multiplies the repetitive-chip sequence, which is output from the phase-rotation unit 34, by the HPSK-spread sequence, which is repeated CRF number of times to perform reverse spreading, then inputs the reverse-spreading result to a symbol-demodulation unit 36.

The symbol-demodulation unit 36 integrates the output from the reverse-spreading unit 53 over the period of the transmission symbols S0 to demodulate the transmission symbols S0, and integrates the output from the reverse-spreading unit 53 over the period of the transmission symbols S1 to demodulate the transmission symbols S1, and outputs the results. In other words, a switch 36a in the symbol-demodulation unit 36 switches the output terminals 0, 1 at a period 2×Tc, and a demodulation unit $36b_0$ for symbols S0 integrates the signals for input chips C00, C01 to demodulate transmission symbols S0, and similarly, a demodulation unit $36b_1$ for symbols S1 integrates the signals for input chips C10, C11 to demodulate transmission symbols S1, and they output the results.

In FIG. 20, construction was shown for only one mobile station, however, there is a phase-rotation unit 34, reverse-spreading unit 53, NCO 35 and symbol-demodulation unit 36 for each mobile station.

With the frequency-division multiplexing receiving apparatus described above, it is possible to accurately demodulate the transmission symbols that were transmitted from the frequency-division multiplexing transmission apparatus of the fifth embodiment.

As many apparent and widely different embodiments of the present invention can be made without departing from the spirit and scope thereof, it is to be understood that the invention is not limited to the specific embodiments thereof except as defined in the appended claims.

What is claimed is:

1. A frequency-division multiplexing transmission apparatus for transmitting data in a frequency spectrum specific to a mobile station, comprising: a chip-dividing unit that divides each symbol of a transmission-symbol sequence into chips; a first phase rotation unit that performs .pi./2 or −.pi./2 phase rotation for the even-numbered or odd-numbered chips of said divided chips; a chip-repetition and rearrangement unit that compresses the time domains of each chip of the chip sequence after phase rotation, then repeats the chips a specified number of times and rearranges the chips of the obtained repetitive-chip sequences so that they have the same arrangement as the original chip sequence; a second phase rotation unit that performs phase rotation that changes at a speed specific to a mobile station for each chip of the rearranged repetitive-chip sequence; and a transmission unit that transmits said phase-rotated chips.

2. A frequency-division multiplexing transmission apparatus for transmitting data in a frequency spectrum specific to a mobile station, comprising: a chip-dividing unit that divides each symbol of a transmission-symbol sequence into chips; a first phase rotation unit that performs .pi./2 or −.pi./2 phase rotation for the even-numbered or odd-numbered chips of said divided chips; a chip-repetition and rearrangement unit that compresses the time domains of each chip of the chip sequence after phase rotation, then repeats the chips a specified number of times (CRF times) and rearranges the chips of the obtained repetitive-chip sequences so that they have the same arrangement as the original chip sequence; a second phase rotation unit that performs phase rotation that changes at a speed specific to a mobile station for each chip of the rearranged repetitive-chip sequence; and a transmission unit that transmits said phase-rotated chips; wherein said second phase rotation unit changes the amount of phase rotation performed for each chip of said repetitive-chip sequence in increments of k2.pi./CRF (k is an integer specific to a mobile station) at each period of the repetitive-chip sequence.

3. The frequency-division multiplexing transmission apparatus according to claim 2 wherein said second phase rotation unit comprises: a rotation-phase-generation unit that generates phase that increases in increments of k2.pi./CRF at each period of said repetitive-chip sequence; and a complex multiplier that performs phase rotation that corresponds to the generated phase for each chip of said repetitive-chip sequence.

4. A frequency-division multiplexing receiving apparatus according to claim 2 comprising: a receiving unit that receives each of the chips of said repetitive-chip sequence that are transmitted from said transmission apparatus; a phase rotation unit that performs phase rotation for the received chips that changes in increments of k2.pi./CRF (k is an integer specific to a mobile station) at each period of said repetitive-chip sequence for each mobile station; and a demodulation unit that performs −.pi./2 or .pi./2 phase rotation for the even-numbered or odd-numbered chips of each chip sequence consisted of the same chip components that are output from said rotation unit and synthesizes the phase-rotated chips for each chip sequence to demodulate the transmission symbols.

5. A frequency-division multiplexing transmission apparatus for transmitting data in a frequency spectrum specific to a mobile station, comprising: a symbol-repetition and rearrangement unit that compresses the time domains of each symbol of a transmission-symbol sequence, then repeats each of the symbols a specified number of times and rearranges each of the symbols of the obtained repetitive-symbol sequence so that they have the same arrangement as the transmission-symbol sequence; a chip-dividing unit that divides the rearranged repetitive symbols into chips;

a first phase rotation unit that performs .pi./2 or −.pi./2 phase rotation for the even-numbered or odd-numbered chips of the divided chip sequence; a second phase rotation unit that performs phase rotation that changes at a speed specific to a mobile station for each chip of the phase-rotated chip sequence; and a transmission unit that transmits said phase-rotated chips.

6. A frequency-division multiplexing transmission apparatus for transmitting data in a frequency spectrum specific to a mobile station, comprising: a symbol-repetition and rearrangement unit that compresses the time domains of each symbol of a transmission-symbol sequence, then repeats each of the symbols a specified number of times (CRF times) and rearranges each of the symbols of the obtained repetitive-symbol sequence so that they have the same arrangement as the transmission-symbol sequence; a chip-dividing unit that divides the rearranged repetitive symbols into chips;

a first phase rotation unit that performs .pi./2 or −.pi./2 phase rotation for the even-numbered or odd-numbered chips of the divided chip sequence; a second phase rotation unit that performs phase rotation that changes at a speed specific to a mobile station for each chip of the phase-rotated chip sequence; and a transmission unit that transmits said phase-rotated chips; wherein said second phase rotation unit changes the amount of phase rotation performed for each chip of said repetitive-chip sequence in increments of k2.pi./CRF (k is an integer specific to a mobile station) at each period of the repetitive-chip sequence.

7. The frequency-division multiplexing transmission apparatus according to claim 6 wherein said second phase rotation unit comprises: a rotation-phase-generation unit that generates phase that increases in increments of k2.pi./CRF at each period of said repetitive-chip sequence; and a complex multiplier that performs phase rotation that corresponds to the generated phase for each chip of said repetitive-chip sequence.

8. A frequency-division multiplexing receiving apparatus according to claim 6 comprising: a receiving unit that receives each of the chips of said repetitive-chip sequence that are transmitted from said transmission apparatus; a first phase rotation unit that performs phase rotation for the received chips that changes in increments of k2.pi./CRF (k is an integer specific to a mobile station) at each period of said repetitive-chip sequence for each mobile station; a second phase rotation unit that performs −.pi./2 or .pi./2 phase rotation for the even-numbered or odd-numbered chips of said repetitive-chip sequence; and a demodulation unit that synthesizes the same chip components that are output from said second phase rotation unit to demodulate the transmission symbols.

9. A frequency-division multiplexing transmission method of transmitting data in a frequency spectrum specific to a mobile station, comprising: a first step of dividing each symbol of a transmission-symbol sequence into chips; a second step of performing .pi./2 or −.pi./2 phase rotation for the even-numbered or odd-numbered chips of said divided chips; a third step of compressing the time domains of each chip of the chip sequence after phase rotation, then repeating the chips a specified number of times (CRF times) and rearranging the chips of the obtained repetitive-chip sequence so that they have the same arrangement as the original chip sequence; a fourth step of performing phase rotation that changes at a speed specific to a mobile station for each chip of the rearranged repetitive-chip sequence; and a fifth step of transmitting said phase-rotated chips; wherein the amount of phase rotation performed for each chip of said repetitive-chip sequence changes in increments of k2.pi./CRF (k is an integer specific to a mobile station) at each period of the repetitive-chip sequence.

10. The frequency-division multiplexing transmission method according to claim 9 wherein said fourth step comprised steps of: generating phase that increases in increments of k2.pi./CRF at each period of said repetitive-chip sequence; and performing phase rotation that corresponds to the generated phase for each chip of said repetitive-chip sequence.

11. A frequency-division multiplexing receiving method according to claim 9 comprising: a step of receiving each of the chips of said repetitive-chip sequence that are transmitted from said transmission apparatus; a step of performing phase rotation for the received chips that changes in increments of k2.pi./CRF (k is an integer specific to a mobile station) at each period of said repetitive-chip sequence for each mobile station; and a step of performing −.pi./2 or .pi./2 phase rotation for the even-numbered or odd-numbered chips of each chip sequence consisted of the same chip components that are output from the rotation unit and synthesizing the phase-rotated chips for each chip sequence to demodulate the transmission symbols.

12. A frequency-division multiplexing transmission method of transmitting data in a frequency spectrum specific to a mobile station, comprising: a first step of compressing the time domains of each symbol of a transmission-symbol sequence, then repeating each of the symbols a specified number of times (CRF times) and rearranging each of the symbols of the obtained repetitive-symbol sequence so that they have the same arrangement as the transmission-symbol sequence; a second step of dividing the rearranged repetitive symbols into chips; a third step of performing .pi./2 or −.pi./2 phase rotation for the even-numbered or odd-numbered chips of the divided chip sequence; a fourth step of performing phase rotation that changes at a speed specific to a mobile station for each chip of the phase-rotated chip sequence; and a fifth step of transmitting said phase-rotated chips; wherein the amount of phase rotation performed for each chip of said repetitive-chip sequence changes in increments of k2.pi./CRF (k is an integer specific to a mobile station) at each period of the repetitive-chip sequence.

13. A frequency-division multiplexing transmission method of transmitting data in a frequency spectrum specific to a mobile station, comprising: a first step of compressing the time domains of each symbol of a transmission-symbol sequence, then repeating each of the symbols a specified number of times (CRF times) and rearranging each of the symbols of the obtained repetitive-symbol sequence so that they have the same arrangement as the transmission-symbol sequence; a second step of dividing the rearranged repetitive symbols into chips; a third step of performing .pi./2 or −.pi./2 phase rotation for the even-numbered or odd-numbered chips of the divided chip sequence; a fourth step of performing phase rotation that changes at a speed specific to a mobile station for each chip of the phase-rotated chip sequence; and a fifth step of transmitting said phase-rotated chips; wherein the amount of phase rotation performed for each chip of said repetitive-chip sequence changes in increments of k2.pi./CRF (k is an integer specific to a mobile station) at each period of the repetitive-chip sequence.

14. A frequency-division multiplexing receiving method according to claim 12 comprising: a first step of receiving each of the chips of said repetitive-chip sequence that are transmitted from said transmission apparatus; a second step of performing phase rotation for the received chips that changes in increments of k2.pi./CRF (k is an integer specific to a mobile station) at each period of said repetitive-chip sequence for each mobile station; a third step of performing −.pi./2 or .pi./2 phase rotation for the even-numbered or odd-numbered chips of said repetitive-chip sequence; and a fourth step of synthesizing the same chip components of the chip sequence whose phase was rotated in the third step to demodulate the transmission symbols.

* * * * *